US011060002B2

(12) United States Patent
Corzani et al.

(10) Patent No.: US 11,060,002 B2
(45) Date of Patent: Jul. 13, 2021

(54) HOT-MELT ADHESIVES PROCESSABLE WITH HIGH SPEED PROCESSES

(71) Applicant: Savare' I.C. S.r.l., Milan (IT)

(72) Inventors: Italo Corzani, Chieti (IT); Biagio Savare', Milan (IT)

(73) Assignee: SAVARE' I.C. S.r.l., Milan (IT)

( * ) Notice: Subject to any disclaimer, the term of this patent is extended or adjusted under 35 U.S.C. 154(b) by 316 days.

(21) Appl. No.: 16/315,789

(22) PCT Filed: Jul. 5, 2017

(86) PCT No.: PCT/EP2017/066789
§ 371 (c)(1),
(2) Date: Jan. 7, 2019

(87) PCT Pub. No.: WO2018/007451
PCT Pub. Date: Jan. 11, 2018

(65) Prior Publication Data
US 2020/0010742 A1    Jan. 9, 2020

(30) Foreign Application Priority Data

Jul. 7, 2016    (EP) .................................... 16178432
Jul. 7, 2016    (EP) .................................... 16178433
Mar. 20, 2017  (IT) ....................... 102017000030594

(51) Int. Cl.
| C09J 123/20 | (2006.01) |
| C09J 5/06   | (2006.01) |
| C09J 11/08  | (2006.01) |
| C09J 123/08 | (2006.01) |
| C09J 123/12 | (2006.01) |
| C09J 123/14 | (2006.01) |

(52) U.S. Cl.
CPC .............. *C09J 123/20* (2013.01); *C09J 5/06* (2013.01); *C09J 11/08* (2013.01); *C09J 123/0815* (2013.01); *C09J 123/12* (2013.01); *C09J 123/14* (2013.01)

(58) Field of Classification Search
CPC ..................................................... C09J 123/20
See application file for complete search history.

(56) References Cited

U.S. PATENT DOCUMENTS 6,218,457 B1    4/2001 Fralich

FOREIGN PATENT DOCUMENTS

| EP | 0 314 495 A2 | 5/1989 | |
| EP | 0314495 A2 * | 5/1989 | ............ C09J 123/20 |
| EP | 1 477 499 A1 | 11/2004 | |
| EP | 2 915 858 A1 | 9/2015 | |
| WO | 2012/052429 A1 | 4/2012 | |

* cited by examiner

*Primary Examiner* — Daniel H Lee
(74) *Attorney, Agent, or Firm* — Bay State IP, LLC

(57) ABSTRACT

A new hot-melt adhesive formulations having improved processability and that are easily processable even with processes at high speed and in particular with Spraying or Fiberization processes. Said hot-melt adhesive formulations comprise, as their main polymer component, at least one isotactic metallocene butene-1 polymer composition, that has a low viscosity, and that has a substantially bimodal composition, directly obtained during polymerization, in two consecutive and separate reaction steps, where the first polymer (polymer A) of said compositionally bimodal polymer composition is an isotactic butene-1 homopolymer or an isotactic butene-1 copolymer with another olefin, while the second polymer (polymer B) is an isotactic copolymer of butene-1, with another olefin, with a chemical composition obviously different from A, qualitatively and/or quantitatively; said hot-melts further comprising a viscosity modifier that is not solid at room temperature.

50 Claims, No Drawings

HOT-MELT ADHESIVES PROCESSABLE WITH HIGH SPEED PROCESSES

CROSS REFERENCE TO RELATED APPLICATION

This application is for entry into the U.S. National Phase under § 371 for International Application No. PCT/EP2017/066789 having an international filing date of Jul. 5, 2017, and from which priority is claimed under all applicable sections of Title 35 of the United States Code including, but not limited to, Sections 120, 363, and 365(c), and which in turn claims priority under 35 USC 119 to European Patent Application No. 16178432.7 filed on Jul. 7, 2016, European Patent Application No. 16178433.5 filed on Jul. 7, 2016 and Italian Patent Application No. 102017000030594 filed on Mar. 20, 2017.

FIELD OF INVENTION

The present invention discloses new adhesive hot-melt formulations that have a novel and optimum processability, even in processes at high manufacturing-line speed and at high or very high deformation rate (known in the technical jargon also as "shear rate"), like it specifically occurs in Spraying and Fiberization application processes.

TECHNICAL BACKGROUND

The hot-melt adhesives of the present invention comprise, as their main polymer component, at least one isotactic metallocene butene-1 polymer composition, that has a low viscosity (and therefore a relatively low average molecular weight), and that has a substantially bimodal composition, directly obtained during polymerization, in two consecutive and separate reaction steps, where the first polymer (polymer A) of said compositionally bimodal polymer composition is an isotactic butene-1 homopolymer or an isotactic butene-1 copolymer with another olefin, while the second polymer (polymer B) is an isotactic copolymer of butene-1, with another olefin, with a chemical composition obviously different from A, qualitatively and/or quantitatively; said hot-melts further comprising a viscosity modifier that is not solid at room temperature.

Besides their novel processability, surprisingly improved (in comparison with other hot-melt adhesives comprising grades of polybutene-1 that are different from the ones used herein) even in application processes at very high line-speed and at high or very high shear-rate, mainly for application by Spraying or Fiberization, the hot-melt adhesives according to the present invention exhibit an unexpectedly wide combination of positive and highly desirable properties for a hot-melt adhesive. In particular:

They exhibit a surprisingly low viscosity and very low values of elasticity in the molten state, which facts, besides justifying—as it will be shown below—their optimum processability at high speed and high shear-rate, allow also to apply them even at relatively low temperatures on thermosensitive substrates, e.g. plastic films at low thermal deformation temperature/melting point and/or on particularly thin substrates, like for instance plastic film or nonwoven fabrics having a particularly low basis-weight.

They exhibit very good properties of high cohesion (a characteristic that is generally incompatible with a low viscosity in the molten state, for a hot-melt adhesive) and of a strong adhesion, even immediately after their setting from the molten state.

After their setting from the molten state, they undergo, in their solid state and at their use-temperature (generally room temperature) a slow crystallization of their chains of polybutene-1, crystallization that is delayed in time and controllable, that causes a significant further improvement of their already good initial adhesive, cohesive and mechanical properties. Said phenomenon of slow crystallization at room temperature, that leads to the formation of controllable and optimal quantities of crystals of polybutene-1 that are particularly robust and morphologically "perfect", can be detected for example through the substantial change of the main mechanical and rheological parameters of the hot-melt compositions, like e.g. a significant increase of their surface hardness (as measured for example according to the Test Method ASTM D1321-04); of their Elastic Modulus G' and of their Tensile Stress at Break, accompanied on the contrary by a significant decrease of their Elongation at Break and their rheological parameter Tan Delta.

Moreover, a further important effect on the adhesive properties of the present hot-melt formulations that derives from said slow crystallization, is the significant effect on the change in time of the tack of the formulations themselves.

While, immediately after their setting from the melt (i.e. at "time zero" for whose definition see below) the adhesive formulations according to the present invention are, at room temperature, soft and very tacky adhesives, capable therefore of creating immediately optimum adhesive bonds with a broad range of substrates, then their subsequent crystallization delayed in time, that profoundly changes (as it will be shown in more details below) their rheological, mechanical and adhesive properties, is powerfully affecting even the initial surface tack of the present adhesive formulations.

Said tack that, as already mentioned, is quite high at time zero, as it is just requested for immediately forming excellent adhesive bonds, decreases with time (i.e. with the progressing of the crystallization) towards surprisingly lower values and falls even to zero, thus giving adhesives that, in their final state, do not show any residual tack and that can be defined as fully "tack-free".

This characteristic in an adhesive of dramatically varying its own tack by simple short aging at room temperature, up to the point of not showing any more any residual tack, it's a highly important and valued characteristic, especially in all those fields of use (e.g. in hygienic absorbent articles) where, during use, some adhesives contained inside the article might accidentally contact the user's skin, causing in such a way severe discomfort and possible drawbacks; or in cases in which the article—subjected to pressure inside its packaging—might, if the construction adhesives continue to remain strongly tacky, undergo undesired bondings between different components that should not bond one to the other, or undergo permanent structure deformations, and so on.

Said slow crystallization, delayed in time, in the solid state and at room temperature of the hot-melt adhesive formulations according to the present invention, starts to be detectable typically not earlier than about two hours after the solidification of the adhesive from the molten state, while other hot-melt adhesives based for instance on different polyolefins, like polyethylene, polypropylene, their copolymers etc. reach in a practically immediate way, after solidification, their final level of crystallinity, that can be reached, case by case, as a function of their molecular structure and composition. On the contrary, the crystallization, in the solid state and delayed in time, of the present hot-melt adhesives generally is completed in a few days, for example between about one day and about seven days, typically in about five days.

The fact that initially the material is, in its solid state, immediately after its solidification from the molten state, cohesive but at the same time soft and with high values of the rheological parameter Tan Delta, allows the immediate formation of surprisingly strong adhesive bonds. In fact, as it is well clear to every person with at least an average skill in the field of hot-melt adhesives, this characteristics allow a very close contact between the adhesive and the substrates to be bonded and an excellent wettability between them, therefore maximizing the strength of adhesive bonds.

Said peculiar rheological characteristics of the hot-melt adhesives according to the present invention, cause also the fact that they exhibit an "open time" (for whose definition and measurement, see below) significantly long, that allows an optimum and very easy control of all the gluing processes with substrates of various nature. Furthermore the fact that, at the beginning, the rheological parameter Tan Delta has high values, enables the hot-melt adhesives according to the present invention to continue to "flow" even in their solid state, in such a way getting into a very close contact with the substrate and—in case a substrate is porous, fibrous or perforated—partially penetrating even inside the pores, between the fibers or in the holes of said substrate, which circumstance further strengthens the adhesion through the formation not only of adhesive bonds but also of mechanical interlockings between adhesive and substrate. Said peculiar behavior makes the hot-melt adhesives according to the present invention particularly suitable for being used on porous or fibrous substrates, or on perforated films both with a bidimensional or a tridimensional structure, substrates that are very often used for example in hygienic absorbent articles.

However the above mentioned high values of Tan Delta would be deleterious if they would remain constantly too high for too long, because the adhesive would continue to flow inside the substrate or inside the article within which it is applied. In this way, the adhesive might even fully migrate elsewhere, in areas different from the surface that must be glued, and therefore this might cause that the adhesion strength values heavily drop because of the "physical disappearance" of the adhesive itself; or the adhesive might even "resurface" on the opposite side of a fibrous or perforated substrate, in this way causing the so called negative phenomenon known as "bleed-through", by which the external side of a fibrous or perforated substrate, because of the adhesive that has mainly migrated through the holes to the external side of said substrate, may inopportunely adhere to other parts of the article inside which it is contained and to which parts it should not adhere, or it might be unpleasantly tacky on the user's skin, and so on.

Without being linked to any theory, it appears reasonable to suppose that this novel and surprising combination of positive and highly desirable properties for hot-melt adhesives (combination of properties even sometimes contradictory among them, like the contemporary presence of a low viscosity in the molten state and an excellent immediate cohesion in the solid state, even before the starting of the crystallization phenomenon, delayed in time) derives from the novel and peculiar molecular and compositional structure of the novel isotactic metallocene butene-1 polymer compositions, at low viscosity and with a bimodal composition, directly obtained during polymerization, that are used herein.

In particular it seems reasonable to suppose, as it will be explained more clearly below, that the innovative and surprising characteristics of the present adhesive hot-melt compositions are ascribable mainly to the following peculiar characteristics of said polymeric polybutene-1 compositions:

Compositional bimodal structure, with a very narrow distribution around the two centers of modality; in particular this means a substantial absence of fractions both at low and very low molecular weights as well as at high and very high molecular weights, fractions that on the contrary are inevitably always present and in significant amounts, in polybutenes-1 that are synthesized by old synthesis-processes, for example with Ziegler-Natta catalysts.

Sufficiently low average molecular weights, such to give a desired low viscosity in the molten state, and that are obtained already inside the synthesis-reactors in an extremely controlled way, without passing through random processes of molecular breaking by peroxides, as it was necessary to do with old generation polybutenes-1 from Ziegler-Natta catalysts.

Low elasticity in the melt, also due to the above illustrated molecular morphology. This characteristic, combined with the low viscosity, justifies the unexpectedly good processability even in processes at high speed and high shear-rate, especially in Spraying and Fiberization.

Presence of two centers of compositional modality, that work in a novel and highly favorable way during the adhesion process. For example, it is reasonable to suppose that, while the fraction of the polymer that is clustered around the center of modality that has the highest setting temperature, solidifies earlier, giving an optimum cohesion even immediately, the remaining fraction of the polymeric composition continues to flow and to wet the substrate, in this way optimizing the strength of the created adhesive bonds.

Therefore, as it will be better illustrated in much more details in the following pages, the primary scope of the present invention has been to formulate in the most suitable way, as hot-melt adhesive formulations, the above mentioned novel isotactic metallocene butene-1 polymer compositions, at low viscosity and with a bimodal composition, directly obtained during polymerization, that are used herein, in such a way that the present final adhesive formulations fully maintain the innovative and peculiar properties of said novel polymer compositions, especially the ones related to the particularly effective crystallization delayed in time and that occurs in the solid state and at room temperature, combining said unique characteristics of these novel special polymer compositions with the best adhesive, rheological, mechanical and processing properties, in general required to hot-melt adhesives of choice quality.

The hot-melt adhesive compositions according to the present invention, because of their peculiar characteristics of very low viscosity in the molten state; low elasticity in the melt; excellent processability even by Spraying or Fiberization at high speed; combination between strong cohesion and strong immediate adhesion; long open-times that are in any case tunable; a crystallization in the solid state delayed in time, that causes a further significant increase in time of their adhesive and mechanical properties; a very low or even fully null residual final tack, are particularly suitable for being used in the manufacturing of absorbent hygienic articles, in various types of applications inside said articles, applications that up to now generally required the use of different adhesives. For example, without limiting in this way their possible use even in other applications, the hot-melt adhesive compositions according to the present invention can be used, inside absorbent hygienic articles, as general adhesives for the manufacturing of the whole article;

for the bonding of elastic components (threads, strips, elastic films or panels etc.); for the bonding of perforated films that can have both a bidimensional or a tridimensional structure; for consolidating and assuring even in use the integrity of the absorbent cores of the absorbent hygienic article, and so on.

Definitions

The expressions "that comprise(s)" or "comprising" are used herein as open-ended terms, that specify the presence of what in the text follows said terms, but that does not preclude the presence of other ingredients or features, e.g. elements, steps, components, either known in the art or disclosed herein.

The expressions "that is (are) not solid" are used herein to mean that a specific compound or material or ingredient or their blends, are in a physical state in which, even if they have a well definite volume, they do not have a fixed own shape, and they take the shape of the containers that contain them. Even in the case that they are sufficiently viscous to be temporarily shaped by themselves in any tridimensional shape, after being left at rest and without any external stress, apart from their own weight, they permanently deform and spontaneously flow, so to lose rather quickly (typically in a period of time that may vary between a few seconds and about one day) their initial shape, taking the shape of the containers that contain them (if these ones were not already full to the brim) or of the solid surface on which they are lying. Therefore this definition comprises all the materials that not only may be defined as "liquid" (both at high and low viscosity) according to the common meaning of this adjective, but also all those materials that, in the common language, are for example defined as "creamy", "pasty", "jelly-like", "fluid", "greasy", "semi-solid" and the like. A further way of defining in rheological terms what, in the present invention, is meant when a certain compound or material or ingredient or their blends are said to be "not solid" at room temperature, i.e. conventionally at the temperature of 23° C., is also by specifying that said "not solid" matters can be defined as "rheologically liquid", i.e. as defined in Rheology, that they, at the specified temperature of 23° C., have a Viscous Modulus G" that is greater than their Elastic Modulus G', or also, what is equivalent by definition, that their Tan Delta is greater than 1.

"Room temperature", if not specifically defined in a different way, means a temperature equal to 23° C.; and "room conditions" means the conditions of an environment at a controlled temperature and relative humidity, at 23° C. and 50% relative humidity.

"Absorbent hygienic articles" refer to devices and/or methods concerning disposable absorbing and non-absorbing articles, that comprise diapers and undergarments for incontinent adults, baby diapers and bibs, training pants, infant and toddler care wipes, feminine catamenial pads, interlabial pads, panty liners, pessaries, sanitary napkins, tampons and tampon applicators, wound dressing products, absorbent care mats, detergent wipes, and the like.

"Perforated films" refers to films, typically made of plastic materials, like polyethylene, that are perforated with multiple holes, and that can have both a bidimensional or a tridimensional structure, and with a typical hole size in the range between a few hundred microns to about one millimeter, that are often used as components in absorbent hygienic articles.

"Fibrous substrates" refers to products having an essentially planar structure, formed by natural or synthetic fibers or their blends, both in the form of woven and of nonwoven fabrics, equally used as components in absorbent hygienic articles.

"Polydispersity Index" or "Molecular Weights Distribution Index" or "PDI" refers to a measure of the distribution of the molecular weight in a certain polymer. It is defined as the ratio between the weight average molecular weight Mw, and the number average molecular weight Mn: PDI=Mw/Mn. Greater values of PDI correspond to broader distributions curves of molecular weights and vice versa. Mw, Mn and therefore their ratio Mw/Mn=PDI, are measurable e.g. by Gel Permeation Chromatography (GPC).

"Open Time" of an adhesive refers, especially for a hot-melt adhesive, to the interval of time during which, after its application from the melt on a first substrate, the adhesive is able to form sufficiently strong adhesive bonds for the intended use, with a second substrate that is brought into contact under moderate pressure with the first one. It is apparent that too short open times may make difficult-to-manage the application of an adhesive and the formation of sufficiently strong bonds. The open time of a holt-melt adhesive may be measured according to the test method ASTM D 4497-94, in case partially modified in a suitable way (see later for more details).

"Ring & Ball Softening Temperature" refers to the softening temperature of a material, measured according to the Method ASTM D 36-95.

PRIOR ART

The isotactic homopolymers and copolymers (from butene-1 and other olefins, e.g. ethylene) of polybutene-1 have been initially industrially manufactured and sold by Companies like Huls, Mobil, Witco, but mainly Shell, that, since 1977, has been for a long time the main supplier in the world, and whose production is today continued by LyondellBasell.

All the productions of "old-generation" polybutenes-1 were and are made by using Ziegler-Natta type catalysts.

The Company LyondellBasell has recently developed new polybutenes-1 synthesized with metallocene catalysts, both having a substantially "single" or "monomodal" composition, or low viscosity isotactic butene-1 polymer compositions that have a substantially bimodal composition, directly obtained during the polymerization, in two consecutive and separate reaction steps. These latest novel polymeric compositions, are described more in details in the two patent applications of Basell Poliolefine Italia EP 16178432.7 and EP 16178433.5, whose contents are herein incorporated as a reference.

Without being for this strictly linked to an analysis of the differences between the two catalyst-technologies, and the characteristics of the associated manufacturing processes, it is well known that the metallocene technology allows to synthesize polymers having molecular characteristics that are very different and improved, compared with those ones obtainable with the old Ziegler-Natta type catalysts. In particular it is possible to highlight that the Ziegler-Natta catalysts, typically "multi-site", necessarily lead to polymers that are a blend—a more or less random blend, in any case with a very broad "variance" or "dispersion" or "distribution"—of different polymeric chains, that are dissimilar both for molecular weights, as well as for chemical composition (in the case of copolymers).

In this way the synthesis produces polymers that have a very broad distribution/dispersion both of composition and of molecular weights.

On the contrary, it is well known that the use of metallocene catalysts, typically at "single" catalyzing site, allows to obtain extremely narrow distributions, both in regard to composition and to distribution of molecular weights; furthermore, metallocene catalysts make it possible a much more precise control of molecular weights that one intends to obtain, and therefore, for example, they make it possible to produce, already during the polymerization, polymers with particularly low molecular weights, that are particularly suitable for the formulation of low viscosity hot-melt adhesives.

This was not possible with the polybutenes-1 synthesized with Ziegler-Natta catalysts. Said old-generation polymers were characterized not only by very high molecular weights, but also by a rather difficult processability, that made them suitable to be used in low or very low speed production processes, like typically the extrusion of pipes.

To obviate these high viscosities in the melt and to remedy, at least partially, their poor processability in fast processes, generally all these Ziegler-Natta type polybutenes-1 were and are sold already treated and/or added with a certain quantity of organic Peroxides.

Therefore one must intend that in all the examples cited in the Prior Art, that use Ziegler-Natta type polybutenes-1, a thermal molecular breaking of the polymer with peroxides is present, even when this is not expressly said, since said peroxides were and are added by the suppliers themselves—like e.g. Shell—before the sale of these polymers on the market.

During the treatment at high temperature and in the molten state of these polybutenes-1, these peroxides cause, through a radical mechanism, a breaking and decrease of the average molecular weight of these polybutenes-1, that lowers their melt viscosity and somehow improves their processability, at least in low speed processes, thanks also for example to the "lubricating" action of the additional quantity of low molecular weight chains generated during the radical process of breaking and fragmentation of the initial long polybutene-1 chains, caused by peroxides.

It is however apparent to every averagely skilled person in the science of polymers, that said breaking of molecular weights through a thermal mechanism by peroxides, is a chaotic, random process, totally uncontrolled and uncontrollable in its final results.

As a first consequence, besides finding practical limits in the minimum melt viscosities that in any case are achievable by said technique, and that continue to remain quite high (viscosities that are expressed e.g. as MFR of the degraded polymer—for the definition of MFR, see below), it is clear that this chaotic and uncontrolled breaking of the long starting chains of polybutene-1, generates new chains whose structure (e.g. possible presence and quantity of branching side chains), whose length (molecular weight) and even whose composition (in the case of copolymers) is totally random and uncontrollable, and that gives final polymers whose chemical and physical-chemical characteristics have a high degree of variance and unpredictability.

Said in other words, this means that, even if one starts from the same high viscosity polybutene-1 from Ziegler-Natta catalysts, and even if one keeps, in various experiments of molecular weight breaking, exactly the same experimental conditions (i.e. one uses the same type and quantity of breaking peroxide, prolongs exactly for the same time the thermal breaking treatment, at the same temperature and eventually obtains a degraded final product that has more or less the same average global melt viscosity, i.e. the same global MFR), actually each experiment generates polymers that—being generated by random processes—are highly variable and "dissimilar" from case to case, in terms of structure, length and composition (for the copolymers) of the newly generated chains, produced in the thermal breaking process.

This high variability and uncontrollability/unpredictability of the molecular characteristics of the final polymeric products, generated in such a process (even—let's repeat—if one should obtain a more or less equal final global MFR), it's a highly undesirable and potentially negative characteristic, especially when said polybutenes-1, degraded with peroxides, are used as ingredients of hot-melt adhesives.

It is in fact well known to every averagely skilled person in the science of formulating hot-melt adhesives, how the molecular characteristics of used polymers have a very strong influence on all the main characteristics of the adhesive (adhesivity, cohesion, melt elasticity and therefore good or bad processability, especially in high speed processes etc.).

It is moreover also well known that, for certain hot-melt formulations that may be close to the "critical limit" of this or that fundamental characteristic for an adhesive, possible variations in the molecular characteristics of the base polymer, that are apparently even of very low magnitude, may actually cause dramatic and very strong changes, even fully not acceptable, in the main application properties (adhesive, cohesive, related to the process etc.) of the hot-melt adhesive that comprises said polymer.

Moreover, in the herein discussed case, i.e. of hot-melt adhesives comprising polybutenes-1 from Ziegler-Natta catalysts, that are thermally treated with peroxides to lower their average viscosities, initially unacceptably high, a further important effect must be taken into consideration, besides the fully unpredictable effects of such treatment (potentially even very negative effects) on the main characteristics of the final adhesive (process properties, adhesive properties, cohesive properties etc.).

As mentioned above and as it will be better explained below, a fundamental and practically unique characteristic of hot-melt adhesives comprising polybutene-1, is the fact of showing a crystallization delayed in time, and that—when it can take place in an optimum and controllable way—can lead to an additional and significant improvement of the already good initial adhesive, cohesive and mechanical properties of the adhesive.

As it is well known to every averagely skilled person in the science of polymers, one can state that the crystallization of a polymeric matrix is taking place in an easier way, i.e. that the formed crystals are more numerous and qualitatively more "perfect", the more the molecular characteristics of the polymeric chains are "similar" among them, with regard to their structure, composition, molecular weight (better if not too high) etc.

It is therefore apparent that the above mentioned process of molecular breaking with peroxides of polybutenes-1 from Ziegler-Natta catalysts, process that has as its primary effect the fact of broadening the variance of structure, length, composition (for the copolymers) etc. of the molecular chains of polybutenes-1, after their treatment, has a negative influence also on their crystallization delayed in time, by limiting or even impairing the beneficial effects that might be expected.

Anyhow, returning to what is taught by the Prior Art about the use of polybutenes-1 in the formulation of hot-melt adhesives, the main past supplier of polybutenes-1 itself, i.e. Shell, teaches, in a few patents filed on the possible use of homopolymers or copolymers of polybutene-1 from Ziegler- Natta synthesis, in the formulation of hot-melt adhesives, for example in the U.S. Pat. No. 4,568,713, how it is anyhow indispensable to make a previous breaking of the average molecular weight of these polymers, through a thermal treatments with peroxides, before compounding them into hot-melt adhesive compositions. It is for this reason that, as already mentioned, all these polybutenes-1 from Ziegler-Natta catalysts are anyhow treated ad added with suitable quantities of peroxides.

For example, it is just this the case of the homopolymers and copolymers of polybutene-1 that are cited in the U.S. Pat. No. 6,218,457, and sold at that time by Shell, like the homopolymer DP 0800 or the copolymers butene-1/ethylene DP 8510 and DP 8910.

In spite of the breaking of molecular weights, caused by the peroxides present in such polymers, during the thermal treatment for the preparation of the hot-melts adhesives, the final melt viscosities of the hot-melt adhesive compositions mentioned in the Examples of U.S. Pat. No. 6,218,457, are still very high. In fact they vary between a minimum of 7,300 mPa·s and a maximum of 31,200 mPa·s, measured at 163° C. (325° F.).

As it is quite clear to every averagely skilled person in the field of the preparation and processing of hot-melt adhesives, the above mentioned hot-melts, that have high or very high melt viscosities, are not processable in high-speed application processes, and in particular they are not at all processable in application processes at high or very high shear-rate, as typically by Spraying or Fiberization.

With regard to the Prior Art, taught by U.S. Pat. No. 6,218,457, it is worthy also to emphasize that in several of the disclosed examples, the hot-melt adhesives comprise another polymer, and in particular an APAO (amorphous-poly-alpha-olefin), even in quantities significantly greater than polybutene-1; in such a way that the formulations disclosed in such examples should be more appropriately regarded as APAO-based formulations, modified with lower quantities of polybutene-1, and not vice versa. The presence, in quantities even predominant with regard to the polybutene-1, of dissimilar polymers, like APAO's, is necessary for improving to an acceptable level the adhesive, cohesive and processability properties of the adhesive, which properties—if the Ziegler-Natta polybutene-1 were the only polymer in the formulations—would be clearly per se unsatisfactory. Moreover, with regard to the following crystallization delayed in time of polybutene-1, that in any case is a positive and desired effect because it can further increase the adhesion and cohesion of the disclosed hot-melts, it is necessary to emphasize that the presence of high quantities of polymers dissimilar from the polybutene-1, and especially of amorphous polymers like APAO's, even in predominant quantities with regard to the polybutene-1, can only negatively influence said crystallization, both in kinetic and quantitative terms, given the fact that the crystallizable polymer polybutene-1 is anyhow "diluted" and disturbed in its crystallization by the presence of a preponderant quantity of a polymer like an APAO, that is per se amorphous and that cannot crystallize.

In other examples of U.S. Pat. No. 6,218,457, where are not present prevailing quantities of APAO's, it appears on the contrary indispensable to add substantial quantities of a poly-iso-butylene plasticizer (PIB, a substance that is chemically and structurally fully dissimilar from a polybutene-1) for lowering to an at least not excessive level the viscosity and therefore for allowing the processing of the formulations and also for improving their adhesion.

However such addition of said plasticizer seems to affect so negatively the properties of cohesion and crystallization of the disclosed formulations, that comprise Ziegler-Natta type polybutenes-1, that inventors are obliged to add at the same time unusually high quantities, even between about 15% and about 20% by weight, of a crystalline wax, an ingredient that notoriously works as a nucleating agent, i.e. as an initiator and accelerator for the crystallization of polybutene-1.

Nevertheless, every averagely skilled person in the science of hot-melt adhesives, well knows that the addition of a wax in such high quantities, tends to impair the adhesive properties of a hot-melt adhesive, lowering its tack, shortening very much its open time (that often becomes as short as about a few seconds or even shorter than a second) and that tends to make the adhesive composition excessively hard and fragile. It is worthy to notice that, in spite of the considerable addition of waxes and plasticizers, ingredients that have both per se a very low viscosity, the viscosity of the examples even without APAO disclosed in U.S. Pat. No. 6,218,457 continues to be exceptionally high, equal to 10,375 mPa·s and 10,625 mPa·s a 163° C. (325° F.), which fact makes anyhow very difficult to process these hot-melts in the molten state, and certainly makes it impossible to apply them with processes at high speed and high shear-rate, like Spraying and Fiberization.

Other patents of the Prior Art, like e.g. U.S. Pat. No. 5,786,418, teach, in the disclosed examples, to formulate copolymers of polybutene-1 (in all cases old-generation polymers, i.e. synthesized with Ziegler-Natta catalysts) in hot-melt adhesives with viscosity even somehow lower, for example at 325° F. (163° C.), viscosities between 1,500 and 5,500 mPa·s, without the addition of prevailing quantities of other polymers. However also this formulation strategy seems to negatively affect the adhesive and cohesive properties of the formulations disclosed in U.S. Pat. No. 5,786,418; so much so that the inventors believe that it is necessary to demand that, for forming sufficiently strong adhesive bonds for being used in their invention, said adhesives have an exceptionally short "open time", equal to about half a second; i.e. this means that typically no more than 0.5 seconds can elapse between the application of the adhesive from the melt on a first substrate, and the contact with the second substrate to be bonded, if one wants to get a sufficiently strong adhesive strength.

Obviously such an exceptionally short open time is a strong limitation of the usefulness of the invention, because it affects and heavily limits the possibility for said compositions to be used even in other processes and other applications that are slower, and in which a time interval that at the upmost is not longer than half a second, between the application of the adhesive and the gluing of the second substrate, is an operative situation that is very difficult, and in some cases, even impossible to be achieved.

Other Prior Art patents, all of them still referred to polybutenes-1 from Ziegler-Natta catalysts, try to maximize the ability of polybutene-1 of crystallizing in the solid state, through the addition of significant quantities of crystalline substances that act as crystallization initiators/nucleating agents, like for instance crystalline polymers, crystalline waxes or crystalline solid plasticizers.

In some cases, the Prior Art takes advantage from a somehow "uncontrolled", massive and rapid crystallization of polybutene-1 for obtaining hot-melt adhesives that are temporary adhesives, i.e. that totally and shortly lose their initial adhesive properties, passing from a state of adhesion to a state of non-adhesion, as e.g. it is taught by U.S. Pat. No.

8,454,792; or hot-melt adhesives that become so hard and fragile, because of their excessive crystallization, that the substrates bonded with these adhesives are easily debonded one from the other by cohesive fracture of the adhesive itself, as claimed by U.S. Pat. No. 5,256,717.

For fostering in the used old-generation polybutenes-1, like the polymers DP 8910 or PB 0800 M, a particularly massive and fast crystallization, U.S. Pat. No. 8,454,792 uses high levels of a crystalline wax, while U.S. Pat. No. 5,256,717 uses a crystalline solid plasticizer; in both cases the crystalline structure of these additives works as a nucleating agent and an accelerator of the polybutene-1 crystallization, making faster its kinetics and increasing the final level of crystallinity.

In summary, according to what is taught by Prior Art, it is not possible to formulate hot-melt adhesives, based on homopolymers and/or copolymers of isotactic polybytene-1 synthesized with Ziegler-Natta catalysts, that possess at the same time a whole series of features that are highly desirable in hot-melt adhesives, like for example low viscosity and low elasticity in the melt; high initial cohesion and high initial adhesive strength without the addition of massive amounts of other polymers that however might disturb and impair the subsequent crystallization of polybutene-1; initial adhesive strength that further significantly increases with time, thanks to a crystallization in the solid state that takes place in a slow and controllable way and that is particularly ordered and "robust"; excellent processability even in high-speed processes and especially in processes like Spraying and Fiberization; open-time of the adhesive that is sufficiently long for allowing an easy and strong bonding in a large variety of different processes, and that is anyhow tunable; a very low or even fully null residual final tack; rheological properties in the solid state and at the use-temperature (typically room temperature) that significantly change with time, since the moment when the adhesive solidifies, with the progression of the crystallization, first of all with a substantial increase of the Elastic Modulus G' and a significant decrease of Tan Delta, which changes maximize the adhesive strengths in general, but that are particularly highly beneficial in the bonding of porous or fibrous substrates and of perforated films both with a bidimensional or a tridimensional structure, inside which the adhesive, even if it is already in the solid state, can continue to flow and physically penetrate, in this way adding to the sole pure adhesive strength also a strong mechanical interlocking with the substrates etc.

SUMMARY OF THE INVENTION

The problem that the present invention intends to solve is to formulate hot-melt adhesives that are very well processable even in processes at high and very high speed, and that show at the same time a low viscosity in the melt and a low application temperature, however combined with a high cohesion in the solid state and a high adhesivity, even immediately after their solidification from the melt, said latest properties being such that they further increase with time, outperforming the drawbacks of the existing prior art, and maintaining at the best, in the final hot-melt adhesive formulations, the peculiar characteristics of the novel metallocene butene-1 polymer compositions, having a bimodal composition, comprised herein, especially the properties related to the particularly effective crystallization delayed in time, and that occurs in the solid state and at room temperature.

Said problem is solved by an adhesive composition having the characteristics of claim 1), by a bonded structure having the characteristics of claim 42), by an article having the characteristics of claim 44), and by an article having the characteristics of claim 48). The other sub-claims disclose preferred embodiments.

DETAILED DESCRIPTION OF THE PREFERRED EMBODIMENTS AND MAIN PROPERTIES OF THE ADHESIVES ACCORDING TO THE PRESENT INVENTION

The Crystallization Delayed in Time of the Hot-Melt Adhesives According to the Present Invention.

As noted, the hot-melt adhesives according to the present invention show, in the solid state and at their use temperature (generally coincident with room temperature), a slow crystallization of the isotactic metallocene bimodal polybutene-1 composition, at low viscosity, that is comprised in said hot-melts. Said crystallization, controllable and delayed in time, leads to a further significant improvement of the already good initial adhesive, cohesive and mechanical properties of these hot-melt adhesives.

The ability in general of isotactic polybutene-1, both in its homopolymers and in its copolymers, of slowly crystallizing in the solid state, in a fully peculiar way, different from the behavior of all other polyolefins, is well known in the Art. This particular characteristic was noticed since the synthesis of the first lab samples of this polymer, in 1954 by its discoverer, the Nobel Prize Giulio Natta.

While all other crystallizable polyolefins, for instance polyethylene or isotactic polypropylene, when they solidify from the melt achieve in a very rapid and often practically instantaneous way the final crystalline structure and percentage of crystallinity that they are able to achieve according to their specific molecular morphologies, isotactic polybutene-1 crystallizes in a profoundly different way.

Without entering a detailed discussion of said mechanism, it is possible to think that the peculiar molecular structure of isotactic polybutene-1 chains, formed by a compact series of side groups C2, that are relatively long and sterically bulky, positioned one close to the other, makes much slower the formation of crystalline regions, in comparison to what it happens for example in polypropylene or in polyethylene.

However, the highly ordered structure, as well as the helicoidal spatial conformation that the chains of polybutene-1 tend to assume, lead in this polymer—after a certain time—to the formation of fractions of crystallinity that are significantly larger in comparison to the other semi-crystalline polyolefins, and to final mechanical properties of polybutene-1 that are significantly more robust.

Said process of a slower, larger and more robust growth in isotactic polybutene-1 of a crystalline structure, is further fostered by the poly-morphicity of this polymer, that has as many as three distinct crystalline forms.

One of them (called Form III) is formed only from solutions and is not of interest in the present invention. A second crystalline form (called Form II, with a tetragonal structure) is formed first by solidification from the melt, like in the present case.

Both these two forms of isotactic polybutene-1 are thermodynamically unstable and slowly transform into the stable hexagonal crystalline form—called Form I—that has a melting point and mechanical properties that are higher.

Therefore, the phenomenon that, from now on, will be called "crystallization delayed in time" is actually a much more complex phenomenon that, besides a slow growth of new crystals, comprises also a slow transformation of Form II crystals, with a tetragonal structure and thermodynamically unstable, that have initially formed after the solidification from the melt, into stable and more robust hexagonal Form I crystals.

This peculiar crystallization delayed in time, considering this phenomenon in general terms, is present in every isotactic polybutene-1, independently of its synthesis process.

However the fundamental differences at a molecular level that exist between the old homopolymers and copolymers of isotactic polybutene-1, monomodal and at high viscosity, synthesized with Ziegler-Natta catalysts, and the novel isotactic metallocene butene-1 polymer compositions, at low viscosity and with a substantially bimodal composition, lead to fundamental differences also in the way how said crystallization of polybutene-1 chains may take place, both under qualitative and quantitative aspects, even when all other boundary conditions remain the same.

Let's recall once again that the old-generation polybutenes-1, from Ziegler-Natta catalysts, are characterized by a high or very high melt viscosity, i.e. by very high average molecular weights, and by very broad Molecular Weight Distributions/high Polydispersity Indexes, typically greater than 4 and sometimes greater than 6; i.e. they are characterized by the presence of significant amounts of fractions both at high and very high molecular weight, and at low and very low molecular weight.

On the contrary the present novel isotactic metallocene butene-1 polymer compositions, at low viscosity and with a substantially bimodal composition, have controlled average molecular weights that are much lower, for example between about 30,000 and about 100,000; and above all in these novel polymer compositions both fractions at very high molecular weight as well as fractions at very low molecular weight are practically absent. This is clearly shown by their small Polydispersity Indexes that, taking into consideration the complex of the bimodal polymer compositions formed by the two polymers A) and B) (polymer composition and polymers a detailed description of which is given below), is not greater than 4, and is often significantly smaller; while for the two single constituting polymers it typically is not greater than 2.5.

Without depending from any theory, one could e.g. think that the substantial absence, in the polymer compositions used in the present invention, of a massive fraction of chains with a very low molecular weight, each of which small chains may work as a nucleating agent/crystallization initiator, prevents the possibility that the polymer crystallization may activate in a too fast and uncontrolled manner, forming an excessive quantity of crystals, which fact—as seen in some examples of the Prior Art—can even destroy the adhesive properties themselves.

Or, it is also possible to reasonably think that, as it is clear to every averagely skilled person in polymer science, the absence itself of a massive fraction of very low molecular weights, and therefore the absence of a very large number of possible crystallization nuclei/centers, allows—in the hot-melt adhesives of the present invention—the formation of crystals that are on average larger, more robust and morphologically more "perfect" in comparison with what can happen in similar hot-melt adhesives that are on the contrary based on old polybutenes-1 from Ziegler-Natta catalysts, leading in this way to a significant improvement both of final mechanical and adhesive properties of the hot-melt adhesives disclosed in the present invention.

Therefore the presence of a substantially smaller quantity of "spontaneous crystallization centers", consisting essentially in the chains with the lowest molecular weights, causes also the result that the crystallization of the hot-melt adhesives of the present invention takes place on average in a slower way, with two main positive consequences.

From one side, this slower and more controlled crystallization tends to make the open-time of the adhesives of the present invention longer, typically not shorter than 10 minutes, preferably not shorter than 30 minutes and more preferably not shorter than 60 minutes, with advantageous consequences on the ease with which the present adhesives can be used in a wide variety of different applications and processes.

On the other side, as it will well known to every averagely skilled person in polymer science, a slower crystallization just fosters the formation of crystals that are larger, morphologically more robust and "perfect", therefore further improving the properties of adhesive strength and of mechanical strength of the hot-melt adhesives of the present invention.

It is also reasonable to think that even the almost total absence, in the adhesive formulations of the present invention, of fractions at high and very high molecular weight, that are on the contrary massively present in polybutenes-1 from Ziegler-Natta catalysts, has also important positive consequences on the quality and quantity of the crystalline phase that it is possible to obtain.

For example, it is well known in polymer science that the level of final crystallinity that can be obtained in a polymer and the "quality" of its crystals are inversely dependent on its average molecular weight; and that such characteristics decrease/get worse with the increasing of the average molecular weight, as e.g. clearly explained in the book "Crystallization of Polymers", edited by Marcele Dosiere, page 26 and following pages, that is herein incorporated as a reference.

It is also necessary to point out that the narrow distribution in purely compositional terms (besides in terms of molecular weights) that is typical of the novel isotactic metallocene bimodal butene-1 polymer compositions, used in the present invention, can have positive consequences also on the quality and quantity of the crystals formed in our adhesive formulations.

It is in fact very reasonable to think that polymer chains, that are similar one to the other, not only for their average length (molecular weight), but also for their composition and structure, are capable, in their slow crystallization in the solid state and at room temperature, of forming crystals that are significantly larger, more homogeneous and "perfect" and more robust in comparison to what it may happen in isotactic polybutenes-1 of Ziegler-Natta type, therefore substantially improving all the adhesive and mechanical properties of the hot-melt adhesives themselves.

Said slow crystallization at room temperature of the hot-melt adhesive formulations according to the present invention, leads to important variations of the adhesive, mechanical and rheological properties of the hot-melts themselves; these properties that are already good, immediately after the hot-melts' solidification from the molten state, further improve with the progressing of said crystallization, that completes in about a few days, indicatively from about one to about seven days, and typically in about five days.

Unless specifically indicated in a different way, all the below mentioned properties for the materials aged at room temperature, are intended to be measured at 23° C. and on samples kept for five days in a conditioned room at 23° C. and 50% relative humidity.

The initial properties, called also "at time zero", are on the contrary typically measured, still at 23° C. (unless a different temperature is specifically indicated) and at 50% relative humidity, but at a time that is not longer than two hours (120 minutes) after the solidification from the melt of the adhesive under examination.

For instance, regarding the adhesive properties of hot-melt formulations according to the present invention, they have optimum adhesive properties already at "time-zero" (i.e. not later than about two hours from their solidification from the melt) and these properties further improve after aging at room temperature, for example after five days since their solidification, thanks to the crystallization of their polymeric fraction; this concerns in particular the adhesive properties known in the Adhesive Technology with the names of "Peel Strength" and "Shear Strength".

Still for what concerns the properties directly linked to the adhesive strength of the hot-melt formulations according to the present invention, said formulations have, as already noted, a quite long "open-time", typically not shorter than 10 minutes, preferably not shorter than 30 minutes and more preferably not shorter than 60 minutes.

Even the mechanical properties of hot-melt formulations according to the present invention, exhibit substantial changes during time owing to the crystallization delayed in time. In particular, they are soft and very tacky immediately after being applied from the molten state, so that they are able to adhere in an excellent way on a wide variety of substrates; while, after the completion of their crystallization, typically in about five days, they become much harder and mechanically stronger, in this way further improving their adhesion strength. Said substantial variations of mechanical properties are clearly noticeable e.g. by measuring the variation of their surface hardness, measured by the parameter called "Needle Penetration" according to the method ASTM D 1321-04; or also by measuring the variation, between time-zero and five days, of their Tensile Stress at Break (or Load at Break) and of their Elongation at Break. These latest two properties are measured according to the method ASTM D 638-14, modified for the following details:

Testing speed=300 mm/minute

Dimensions of the "dog-bone" specimen: Total length=73 mm; maximum width=15 mm; thickness=6.5 mm; length of the central narrowest part=19 mm; minimum width of the central narrowest part=6.35 mm.

As it is well known to every averagely skilled person in the science of adhesives, these excellent adhesive and mechanical properties and their further substantial improvement during time for the hot-melt adhesive formulations of the present invention, are also revealed by their rheological parameters, for instance the values of the Elastic Modulus G' and of Tan Delta.

Typically, the adhesive hot-melt formulations according to the present invention show values of Tan Delta that are rather high, immediately after their solidification from the melt, so that they are able to continue to flow even in their solid state and to create adhesive bonds with the substrates, that are unexpectedly strong; while, after aging/crystallization at room temperature, for example after about five days, the value of Tan Delta falls to significantly smaller level. Inversely, the other rheological parameter, the Elastic Modulus G', is relatively low immediately after that the formulations have solidified from the melt, which property make them soft and highly tacky; while, after aging and crystallization, G' has much greater values, in this way further increasing the adhesion and mechanical strengths of the bonded structures, and decreasing to very low values and often even to zero the residual tack of the adhesive formulation.

The above mentioned improvements of the properties of the hot-melt adhesive formulations according to the present invention, caused by their crystallization delayed in time, can be detected also through the changes that exist between the thermal profile (measured e.g. by DSC—Differential Scanning Calorimetry) of an adhesive formulation at time-zero (i.e. at a time that is not longer than two hours since the solidification of the hot-melt adhesive under examination from the melt) and the thermal profile of the same adhesive formulation, measured for instance after five days of aging at room temperature. In particular one can notice the increase in the Melting Enthalpy and the increase of the maximum melting temperature of the crystalline Form I of polybutene-1, that has a higher melting temperature.

Moreover, the hot-melt adhesive formulations of the present invention have a low Brookfield melt viscosity, measured e.g. at the temperature of 170° C., melt viscosity that is not greater than about 5,000 mPa·s, and preferably not greater than about 3,500 mPa·s. Moreover they have a Ring & Ball Softening Temperature (measured according to the method ASTM D 36-95 at time-zero) that is not greater than 120° C., preferably not greater than 100° C. and more preferably not greater than 90° C.

Said properties of low viscosity and low Ring & Ball Softening Temperature significantly improve the processability of the hot-melt adhesive formulations according to the present invention, in comparison to the hot-melt formulations disclosed in the Prior Art, and make it possible to use them even in contact with thermosensitive or very thin substrates, that may be damaged or deformed by the contact with hot-melt adhesives that are applied at too high temperatures.

Processability by Spraying and Fiberization

The hot-melt adhesive formulations according to the present invention have excellent processability in every application process used in the industry for hot-melt adhesives.

However, in particular, one of their most surprisingly positive characteristics is the fact that they exhibit an optimum processability even in those processes at the highest speed and that are the most critical ones, in which processes many standard commercial hot-melt adhesive formulations fail, as for example the processes at the highest applied "shear-rate", like especially the processes by Spraying and by Fiberization.

Without being linked for this to any specific values of process parameters, for example the hot-melt adhesive formulations according to the present invention exhibit—in relatively less critical processes, like slot-die extrusion—optimum processability even at line-speeds equal or even greater than 800 m/minute; and in particularly critical processes, like Spraying and Fiberization, they can be applied in an optimum way even at line-speeds equal or even greater than 400 m/minute.

Besides emphasizing again that the disclosed adhesives can be processed by every application method commonly used for processing hot-melt adhesives, this peculiar optimum processability that they show even in particularly critical processes like Spraying and Fiberization, even at line-speeds uncommonly high, forms one of their most surprisingly positive characteristics.

The application technologies by Spraying and Fiberization offer to their users several peculiar advantages, besides being able to significantly increase the possible productivity, especially when, like in the case of the present adhesives, said processes can be used at uncommonly high line-speeds. For example, because these processes apply the adhesive without a physical contact between the application-head and the substrate, they allow to lay down the adhesive even on thermosensitive substrates, that might be deformed or even destroyed by the direct contact with the metallic head at high temperature; or the adhesive can be laid down even on substrates that have an irregular surface or on particularly thin substrates, like for instance plastic film or nonwoven fabrics having a particularly low basis-weight. Moreover, because in these processes the adhesive covers only a fraction of the substrate's surface, e.g. in the shape of threads laid down in the form of spirals, or as an irregular and discontinuous layer of very small drops or of very short fibers, keeping clear from the adhesive a substantial fraction of the area, these processes allow to apply very small quantities of an adhesive, for instance few grams per square meter, that would be unachievable by a technology of extrusion as a continuous film, and that on the contrary allow substantial savings on the quantity of used adhesive; or they allow to apply the adhesive on substrates that are porous and permeable to air practically keeping unchanged said characteristic, and so on.

In the technology of hot-melt adhesives, as well as in the patent literature that refers especially to hot-melt adhesive with good sprayability, generally the good or poor behavior of a certain adhesive in Spraying and/or Fiberization is assessed through a visual judgment, through the characteristics and the regularity of the geometrical shape of the adhesive applied by these processes, for instance through a minimum achievable width of the spiral, as in U.S. Pat. No. 5,401,792, or through the consistency of the thread's diameter, applied as a spiral, and through the consistency of the width of said spiral, and so on.

It is therefore evident that such judgements about the good or poor sprayability of a certain hot-melt adhesive, based on the visual appearance of the final result in a specific experiment, suffer from a fundamental drawback, both of objectivity—because the consistency and regularity of certain characteristics are judged by the visual personal impression of the observer—and of reproducibility, because it is clear that the geometrical characteristics of the final result depend not only on the adhesive per se, but also on the characteristics of the used specific application-head, on its operating parameters, etc.

With the intent of defining, in a way that is more objective, more scientifically correct and verifiable in a more reproducible way, the good processability in Spraying and Fiberization of the hot-melt adhesive formulations according to the present invention, therefore herein reference is made to the rheological criteria for a good sprayability of a hot-melt adhesive that are illustrated in the article "UNDERSTANDING THE SPRAYABILITY OF HOT-MELT ADHESIVES" by O. Georjon, M. Faissat, F. Chambon, published in the Proceedings of TAPPI 1998 Hot Melt Symposium, article that is herein incorporated as a reference.

From the conclusions of the scientific studies discussed in said article, it is particularly advisable that the hot-melt adhesive formulations according to the present invention have, at the typical application temperature from the melt in Spraying or Fiberization processes, temperature that is on average equal to 165° C., a value of the rheological parameter called Viscous Modulus $G''$ that is not smaller than 200 Pa, when it is read in correspondence with a value of its Elastic Modulus $G'$ equal to 10 Pa; or also, given the definition of the other rheological parameter Tan Delta, i.e. Tan Delta=$G''/G'$, it is advisable that the hot-melt adhesive formulations according to the present invention have, at the temperature of 165° C. and at the frequency at which their $G'$ is equal to 10 Pa, a value of Tan Delta that is not smaller than 20.

This means that, even in their molten state, the hot-melt adhesive formulations according to the present invention exhibit a particularly low "elasticity of the melt"

It is advisable to emphasize that the temperature of 165° C., chosen as the typical reference application temperature from the molten state in the Spraying and Fiberization processes of the hot-melt adhesive according to the present invention, is an ideal process temperature, especially in the manufacturing of articles that comprise thermo-sensitive components like polyolefinic films and nonwoven fabrics, widely used as components in absorbing hygienic articles, in absorbent care mats and surgery sheets for medical applications, as well as several other types of articles, including e.g. packages.

As it is well clear to every averagely skilled person in the art, obviously in the processes for the manufacturing of the above mentioned articles, it is generally possible to operate well even in a range of temperatures slightly lower or slightly higher than 165° C., indicatively a range between about 150° C. and about 180° C. However, it is necessary to stress that it is in general indispensable to avoid temperatures that are too far away from the optimum temperature of about 165° C. Too low temperatures make the hot-melt adhesives not processable in said processes at high speed, like Spraying or Fiberization, owing to their excessive viscosity and excessive elasticity (excessive Modulus $G'$). It is even more important to avoid too high temperatures, too over 165° C., indicatively higher than 180° C. In fact, with said excessive temperatures in spraying or fiberization, the thermo-sensitive components of the manufactured articles would be irremediably damaged, e.g. by melting and holing the polyolefin plastic films because of the excessive heat.

Components of the Hot-Melt Adhesive Formulations According to the Present Invention The hot-melt adhesive formulations according to the present invention, comprise, as their mail polymer component, at least one isotactic metallocene butene-1 polymer composition, that has a low viscosity (and therefore a relatively low average molecular weight), and that has a substantially bimodal composition, directly obtained during polymerization, in two consecutive and separate reaction steps, where the first polymer (polymer A) of said compositionally bimodal polymer composition is an isotactic butene-1 homopolymer or an isotactic butene-1 copolymer with another olefin, while the second polymer (polymer B) is an isotactic copolymer of butene-1, with another olefin, with a chemical composition, obviously different from A, qualitatively and/or quantitatively; said hot-melt adhesive formulations further comprising a viscosity modifier that is not solid at room temperature.

The Metallocene Polymer Compositions of Isotactic Butene-1, with Low Viscosity and with a Bimodal Type Composition.

These polymer compositions, at least one of which is comprised in the hot-melt adhesive formulations according to the present invention, are the polymeric component, preferably the sole or anyhow the predominant one in the present hot-melt adhesives. Said novel metallocene polymer compositions of isotactic butene-1, with low viscosity and with a bimodal type composition, directly obtained during polymerization, in two consecutive and separate reaction steps, are disclosed in more details in the two patent applications of Basell Poliolefine Italia EP 16178432.7 and EP 16178433.5, whose contents are herein incorporated as a reference.

Anyhow, each of them can be concisely described as a butene-1 polymer composition having Melt Flow Rate values—measured according to ISO 113 at 190° C. under a load of 2.16 kg—of from 400 and 2,000 g/10 min. and preferably of from 400 and 1,800 g/10 min., that has a bimodal type composition, comprising:

A) a butene-1 homopolymer or a copolymer of butene-1 with one or more comonomers selected from ethylene and higher alpha-olefins with a number of Carbon atoms equal to three or greater than three, having a copolymerized comonomer content ($C_A$) not greater than 5% by mole, preferably not greater than 4% by mole;

B) a copolymer of butene-1 with one or more comonomers selected from ethylene and higher alpha-olefins with a number of Carbon atoms equal to three or greater than three, having a copolymerized comonomer content ($C_B$) of from 6% to 25% by mole, preferably from 8% to 20% by mole.

Said polymer composition has a total copolymerized comonomer content, referred to the total weight of A) and B), from 4% and 18% by mole, preferably from 5% to 155 by mole.

In a first embodiment of the present invention, said polymer composition has a content of fraction soluble in xylene at 0° C. not smaller than 65% by weight, and preferably not smaller than 70% by weight, said fraction soluble in xylene being determined on the total weight of A) and B).

In a second embodiment of the present invention, said polymer composition has a content of fraction soluble in xylene at 0° C. not greater than 60% by weight, and preferably not greater than 55% by weight, said fraction soluble in xylene being determined on the total weight of A) and B).

Said components A) and B) are preferably obtained directly in a polymerization consisting in two consecutive and separate reaction steps, therefore, the polymer composition described herein can be obtained directly in a polymerization even for what concerns global values of MFR that are sufficiently high (low viscosity), without requiring the use of peroxides or of other substances that generate free radicals, able to break polymeric chains to lower molecular weights.

In a first embodiment of the present invention, specific amounts of fraction soluble in xylene at 0° C. for the butene-1 polymer composition as provided herein, expressed as the weight content of fraction measured by extraction with xylene on the total weight of A) and B), range from 65% to 95% by weight, preferably from 70% to 90% by weight.

In a second embodiment of the present invention, specific amounts of fraction soluble in xylene at 0° C. for the butene-1 polymer composition as provided herein, expressed as the weight content of fraction measured by extraction with xylene on the total weight of A) and B), range from 35% to 60% by weight, preferably from 40% to 55% by weight.

When A) is a copolymer, a specific lower limit of comonomer content is of 1% by mole.

Preferably, when both A) and B) are copolymers, the difference between the percent values of the copolymerized comonomer contents of B) and A) satisfies the following relation:

$(C_B)-(C_A) \geq 5$; or $(C_B)-(C_A) \geq 6$.

The relative amounts of components A) and B) can be easily determined depending upon the desired value of total copolymerized comonomer content, the comonomer contents of the single components and their content of fraction soluble in xylene at 0° C.

Preferred amounts, in the aforementioned first embodiment of the present invention, are from 10% to 40% by weight, and preferably from 15% to 35% by weight of A) and from 60% to 90% by weight, preferably from 65% to 85% by weight of B), referred to the total weight of A) and B). In the aforementioned second embodiment of the present invention, preferred amounts are from 35% to 65% by weight, and preferably from 40% to 60% by weight of A) and from 35% to 65% by weight, preferably from 40% to 60% by weight of B), referred to the total weight of A) and B).

Specific examples of higher alpha-olefins with a number of Carbon atoms equal to three or greater than three, that can be present as comonomers, in addition or in alternative to ethylene, in components A) and B) are alpha-olefins of formula CH2=CHR wherein R is methyl or an alkyl radical containing 3 to 8 or 3 to 6 Carbon atoms, such as propylene, hexene-1, octene-1.

However ethylene is the preferred comonomer, in particular for component B).

The present butene-1 polymer composition has a measurable crystallinity, as demonstrated by the presence, in a Differential Scanning Calorimetry (DSC) pattern, of the melting temperature peaks of the crystalline fractions of polybutenes-1.

In particular, the present metallocene butene-1 polymer composition, having a bimodal composition, shows one or more melting peaks in the second DSC heating scan. Such melting temperature peak or peaks, that generally occur at temperatures not higher than 110° C., mainly from about 75° C. to about 110° C., are attributed to the melting of the crystalline form II of the polybutenes-1 (TmII) and the area under the peaks is taken as a measure of the global melting enthalpy ($\Delta H$ TmII). In case that more than one melting peak is present, the one corresponding to the highest temperature is taken as TmII.

More specifically, the metallocene butene-1 polymer composition, having a bimodal composition and used in the present invention, has a global melting enthalpy $\Delta H$ TmII that is not greater than 20 J/g, in particular from 3 J/g to 20 J/g, measured with a scanning speed corresponding to 10° C./min.

Moreover, the present butene-1 polymer composition show exhibits one or more melting peaks, generally occurring at temperatures not higher than 110° C., in particular from 30° C. to 110° C., in a DSC heating scan carried out after the aging of the material at room temperature for sufficiently long times, preferably not shorter than 24 hours, and more preferably not shorter than five days.

Such temperature peak or peaks are attributed to the melting point of the crystalline form I of the butene-1 polymers (TmI) and the area under the peak (or peaks) is taken as the global melting enthalpy ($\Delta H$ TmI). In case that more than one peak is present, the one corresponding to the highest temperature is taken as TmI.

More specifically, the butene-1 polymer composition used in the present invention has a global melting enthalpy ΔH TmI that is not greater than 50 J/g or less, in particular of from 10 to 50 J/g, or from 15 to 50 J/g, measured with a scanning speed corresponding to 10° C./min.

Without depending for this on any theory, because the crystals of the stable hexagonal crystalline form of polybutene-1 (Form I) are the ones that, as noted, optimize at the best level—if they are numerous and well formed—the final adhesive and mechanical features of the hot-melt formulations according to the present invention, it is preferable that TmI—measured according to what written above—is rather high; in particular it is preferable that it is not lower than 60° C. and even better not lower than 80° C.

The preferred and above mentioned values of global MFR of the metallocene butene-1 polymer composition, with bimodal composition and used in the present invention, can be obtained by combining in opportune ratios, the components A) and B) that in theory may have individual MFR's almost of every value. However, practically, the metallocene butene-1 polymer compositions, with bimodal composition and used in the present invention, are such that even the individual MFR's of the two components A) and B) are sufficiently high, in particular in the range of from 100 to 2,000 g/10 min., and preferably from 200 to 1,800 g/10 min.

According to an old technical habit, in the field of hot-melt adhesives the molten viscosity both of the final adhesive and of its components is often measured with the so-called "Brookfield viscosity" according to method ASTM D 3236-73.

Under this aspect, the metallocene butene-1 polymer compositions, with bimodal composition and used in the present invention, have preferably a Brookfield viscosity of from about 5,000 to about 50,000 mPa·sec, more preferably of from about 5,000 to about 30,000 mPa·sec, measured at 180° C.

Moreover, the metallocene isotactic butene-1 polymer compositions, at low viscosity, with a bimodal composition, used in the present invention, exhibit at least one of the below mentioned further characteristics:

a global Polydispersity Index (i.e. measured by Gel Permeation Chromatography on the composition made by the components A plus B) PDI=Mw/Mn, where Mw is the weight average molar mass and Mn is the number average molar mass, equal to or lower than 4, preferably lower than 3, more preferably lower than 2.5, the lower limit being of 1.5 in all cases;

a Polydispersity Index of the individual components A or B preferably not higher than 2.5;

an Mw not lower than 30,000 and preferably from 30,000 to 100,000;

an intrinsic viscosity, measured in tetrahydronaphthalene (THN) at 135° C., not higher than 0.6 dl/g, preferably from 0.2 dl/g to 0.6 dl/g, and more preferably from 0.3 dl/g to 0.6 dl/g;

isotactic pentads (mmmm) measured with 13C-NMR operating at 150.91 MHz, higher than 90%, preferably higher than 93% and more preferably higher than 95%;

4.1 insertions not detectable using a 13C-NMR operating at 150.91 MHz;

a yellowness index, determined according to ASTM D 1925, not higher than 0, preferably from 0 to −10, and more preferably from −1 to −9, and even more preferably from −1 to −5;

a Shore D Hardness value not greater than 50, preferably not greater than 45, in particular from 15 to 50 and preferably from 15 to 45;

a tensile stress at break, measured according to ISO 527, of from 2 MPa to 25 MPa, preferably from 2 MPa to 20 MPa;

a tensile elongation at break, measured according to ISO 527, of from 100% to 1,000% preferably from 450% to 700%;

a Glass Transition Temperature (Tg) not higher than −22° C., preferably not higher than −23° C., wherein the lower limit is equal to −35° C.;

a density at room temperature not lower than 0.875 g/cm$^3$, preferably of from 0.875 g/cm$^3$ and 0.92 g/cm$^3$, more preferably of from 0.88 g/cm$^3$ and 0.90 g/cm$^3$.

The hot-melt adhesive formulations of the present invention comprise between about 10% by weight and about 85% by weight, preferably between about 30% by weight and about 65% by weight, more preferably between about 40% by weight and about 55% by weight, of at least one metallocene isotactic butene-1 polymer composition, at low viscosity, with a bimodal composition, as described above.

As already mentioned, the primary object of the present invention has been to formulate in the most suitable way, as hot-melt adhesive formulations, the above mentioned novel isotactic metallocene butene-1 polymer compositions, at low viscosity and with a bimodal composition, directly obtained during polymerization, that are used herein, in such a way that the present final adhesive formulations fully maintain the innovative and peculiar properties of said novel polymer compositions, especially the ones related to the particularly effective crystallization delayed in time and that occurs in the solid state and at room temperature, combining said unique characteristics of these novel special polymer compositions with the best adhesive, rheological, mechanical and process properties, in general required to hot-melt adhesives of choice quality.

The formulation strategies and the other components of the hot-melt adhesive formulations according to the present invention, that have been used for achieving said object, are better illustrated in the below paragraphs.

Other Components of the Hot-Melt Adhesives According to the Present Invention

Viscosity Modifiers

The hot-melt adhesive formulations of the present invention comprise at least one viscosity modifier that is not solid at room temperature, i.e. typically at the temperature of 23° C.

It has been already seen, during the discussion of some patents of the Prior Art, that the use of viscosity modifiers that are solid at room temperature (solid plasticizers; solid compounds melting into liquids of very low viscosity, and the like) can affect in a very powerful way the crystallization of polybutene-1 and, as a consequence, the adhesive properties of hot-melt formulations that have been formulated in such a way; so much that said solid plasticizers were, at least in the two discussed cases, the basic ingredient for formulating "temporary" hot-melt adhesives, i.e. hot-melts that rapidly passed from a state of immediate good adhesion to a state of total non-adhesion after a rather short time.

Therefore, the adhesive formulations according to the present invention comprise one or more viscosity modifiers that are not solid at room temperature. As described in more details in the "Definitions" paragraph, with the expression "not solid" it is meant a state of matter in which, even if the body under examination has an its own volume, it doesn't have an its own shape; and also, even if it can be temporarily shaped in a certain shape, it (in a relatively short period of time, typically not longer than one day) permanently deforms and spontaneously flows, even only by the action of its own weight, taking the shape of the container that contains it or of the solid surface on which it is lying. Therefore in such a definition are comprised not only all the materials that can be described as "liquid", but also all those materials that, in the common language, are defined as "creamy", "pasty", "jelly-like", "fluid", "greasy", "semi-solid", and the like.

As better explained in the paragraph "definitions", the viscosity modifiers that are not solid at room temperature that can be used in the present invention, can also comprise all those substances that are defined as "rheologically liquid" at room temperature, according to the definition that in Rheology is given to this adjective, i.e. those substances that are such that, at the aforementioned temperature, their Viscous Modulus G" is greater than their elastic Modulus G'; or also, which is equivalent by definition, such that their Tan Delta is greater than 1. Said viscosity modifiers that are not solid at room temperature further lower the viscosity of the adhesive formulation in its molten state and increase its tackiness.

The viscosity modifier or modifiers, that is/are not solid at room temperature, that can be used in the adhesive formulations of the present invention, comprise e.g. paraffinic mineral oils; naphthenic mineral oils; paraffinic and naphthenic hydrocarbons that are not solid at room temperature, and their blends; oligomers, not solid at room temperature, of polyolefins and their copolymers, like oligomers, not solid at room temperature, synthesized from ethylene, propylene, butene, iso-butylene, their copolymers and the like; plasticizers not solid at room temperature formed by esters like phthalates, benzoates, sebacates; vegetable oils; natural and synthetic greases; and their blends.

Mineral oils and greases, both paraffinic and naphthenic, and their blends, are preferred, as well as the not solid oligomers of polyolefins, and mainly the not solid oligomers of polypropylene and its copolymers with ethylene. Among these last ones, particularly preferred are the metallocene not solid oligomers of polypropylene and its copolymers with ethylene, especially those copolymers in which propylene is the prevailing comonomer as molar fraction. In an embodiment of the present invention, said metallocene oligomers of polypropylene and its copolymers with ethylene, copolymers in which propylene is the prevailing comonomer, and that are not solid at room temperature, have a softening temperature that is not higher than −30° C. and a viscosity at 170° C. that is not higher than 300 mPa·s.

The hot-melt adhesive formulations according to the present invention comprise between about 5% by weight and about 40% by weight of at least one viscosity modifier that is not solid at room temperature or of a blend of viscosity modifiers that are not solid at room temperature, preferably from about 8% by weight and about 30% by weight, and more preferably between about 10% by weight and about 20% by weight.

Tackifiers

In an embodiment of the present invention, the adhesive formulations of the present invention also comprise at least one tackifying resin, having a Ring & Ball softening temperature comprised between 5° C. and 160° C. Among all the possible classes of tackifiers, well known in the field of hot-melt adhesives, the ones that are preferred in the formulations of the present invention belong to those classes that are the most compatible with polybutene-1, and in general with polyolefins. Generally the tackifiers comprised in the formulations of the present invention can be selected among the aliphatic hydrocarbon tackifiers, and their partially or fully hydrogenated derivatives; the aromatic hydrocarbon tackifiers, and their partially or fully hydrogenated derivatives; the aliphatic/aromatic tackifiers, and their partially or fully hydrogenated derivatives; the terpenic tackifiers, and their partially or fully hydrogenated derivatives; the rosins, their esters and their partially or fully hydrogenated derivatives. Fully hydrogenated hydrocarbon tackifiers, both aliphatic and aromatic and aliphatic/aromatic, are particularly preferred because they have an optimum compatibility with the isotactic metallocene polymer compositions, at low viscosity and with a bimodal compositions, that are used in the hot-melt adhesives according to the present invention. Furthermore it has been discovered that it is preferable that the tackifying resins, used in the formulations of the present invention, have a Ring & Ball softening temperature that is not lower than about 80° C., preferably not lower than about 90° C. and more preferably not lower than about 100° C.

In the embodiment of the present invention in which the hot-melt adhesive formulations comprise at least one tackifying resin, they comprise between about 15% by weight and about 70% by weight of at least one tackifying resin or of a blend of tackifying resins, preferably between about 25% by weight and about 60% by weight, and more preferably between about 30% by weight and about 55% by weight.

Additional Components

As seen, a large part of the Prior Art teaches to formulate the old-generation and at high viscosity isotactic polybutenes-1 from Ziegler-Natta catalysts, by blending them with massive quantities of other polymeric compounds, that sometimes are present in percentages even significantly greater than the polybutene-1 itself.

One of the primary purposes for the addition of such massive quantities of different polymers was first of all to improve the characteristics of adhesion, cohesion and processability (given the very high viscosity of the starting polybutenes-1) of the hot-melt adhesive formulations formulated in such a way. A quite often used class of polymers, employed for this scope, were the APAO's (amorphous-poly-alpha-olefins).

On the contrary, the present invention has surprisingly discovered that by using the above mentioned novel metallocene isotactic polybutene-1 compositions, at low viscosity, with a substantially bimodal composition, and with a narrow bimodal distribution both as composition and as molecular weights, the massive addition of different polymers, and especially of APAO's, to improve adhesivity, cohesion and processability of the formulations according to the present invention not only is no longer needed, but it can even have negative effects on the subsequent crystallization delayed in time.

Therefore the hot-melt adhesive formulations according to the present invention preferably do not comprise polymers other than at least one novel metallocene isotactic polybutene-1 compositions, at low viscosity, with a substantially bimodal composition, as above described, apart from what specified below, for specific polymers. In particular, said formulations preferably do not comprise substantially amorphous polymers, as e.g. amorphous poly-alpha-olefins (APAO's). And in case that it is judged anyhow suitable for whatever reason to add small quantities of APAO's or of other polymers that are different from the above mentioned metallocene isotactic butene-1 polymer compositions described above, in any case the global level of these different polymers is not higher than 15% by weight of the whole hot-melt composition, and preferably it is not higher than 10% by weight.

Moreover, it has been also surprisingly found that the adhesive formulations of the present invention do not need, differently from what taught by a part of the Prior Art, the addition of substantial quantities of waxes or of other additional components at high crystallinity that, aging as nucleating agents, might facilitate and accelerate the crystallization of polybutene-1. On the contrary, high quantities of waxes or of other similar crystalline compounds may disturb the slow and regular crystallization of the peculiar metallocene isotactic butene-1 polymer compositions used in the present hot-melt formulations, potentially worsening their adhesive and mechanical properties because they can favor a quicker and disordered crystallization, generating too numerous and on average smaller and less robust crystals.

However, very small quantities of waxes, especially of polyolefin waxes and in particular of polypropylene waxes, especially those ones modified with maleic anhydride, may be added to the hot-melt formulations of the present invention, in quantities not higher than about 5% by weight, to modify in the most suitable way some properties like e.g. the "open times", without nevertheless substantially interfere with the main mechanism of the crystallization delayed in time of the metallocene polymer compositions of isotactic polybutene-1, comprised in the present formulations.

Equally, it has been surprisingly discovered that small quantities of semi-crystalline polymers, preferably semi-crystalline copolymers of propylene, and in particular copolymers of propylene and ethylene, may improve some properties of the hot-melt adhesive formulations of the present invention; for instance, they can tune, even better than waxes, the "open time", without substantially interfering with the basic properties of crystallization of the formulations themselves, and with their excellent processability, without significantly increasing their viscosity in the molten state, provided that also said semi-crystalline polymers are added in small quantities, not greater than about 15% by weight of the hot-melt adhesive, and preferably not greater than about 10% by weight.

In a specific embodiment of the present invention, said semi-crystalline copolymers of propylene and ethylene have a heterophasic morphology, like e.g. the heterophasic copolymers and the polymer compositions sold by Lyondell-Basell under the trade mark Hifax. Other heterophasic semi-crystalline polymer compositions and copolymers of propylene and ethylene that may be used, in quantities not greater than about 15% by weight in the adhesive formulations of the present invention, preferably not greater than about 10% by weight, are for instance the ones sold by ExxonMobil under the trade mark Vistamaxx.

Moreover, the hot-melt adhesive formulations of the present invention, that comprise as main polymeric component at least one metallocene isotactic polymer composition of butene-1, at low viscosity, with a bimodal composition, directly obtained during polymerization, according to what previously described, may comprise also, as an optional secondary polymeric component, and in quantities not greater than about 15% by weight, homopolymers or copolymers of butene-1, that are metallocene-derived, isotactic, at low viscosity but with a monomodal composition. The low viscosity of said homopolymers or copolymers of butene-1, metallocene-derived, isotactic, and with a monomodal composition, is expressed by their Melt Flow Rate, measured according to ISO 1133, that is comprised between 200 and 2,000 and preferably between 500 and 1,600.

The hot-melt adhesive formulations according to the present invention may further comprise between about 0.01% by weight and about 10% by weight of at least one stabilizer, like anti-oxidants, anti-UV photo-stabilizers, and their blends. They may also further comprise up to about 15% by weight of other additional optional components like mineral fillers, pigments, dyes, perfumes, surfactants, anti-static agents.

Main Adhesive Parameters

The adhesive properties of the formulations according to the present invention, and their changes with time, as well as the adhesive properties of other comparative adhesive formulations, can be evaluated by three types of parameters:

i. the parameter called "open time", i.e. the interval of time during which, after its application from the melt on a first substrate, a hot-melt adhesive is able to form sufficiently strong adhesive bonds for the intended use, with a second substrate that is brought into contact under moderate pressure with the first one. In particular the open time of the holt-melt formulations under examination is measured according to the test method ASTM D 4497-94, with the following conditions for the hot-melt adhesive formulations considered herein:

coating temperature for the adhesive film: 170° C.
thickness of the adhesive film=1 mm ii. the adhesive property known in the field as "peel strength", i.e. the average force per unit of length, needed to separate two substrates glued by the adhesive composition under examination, said force being determined through a separation made at a fixed and constant speed, and under a fixed and constant separation angle. It is measured according to the test method ASTM D 1876-01, applying however a separation speed between the two substrates of 150 mm/minute, and therefore a moving speed of the test machine equal to 300 mm/minute. The two used substrates are a microporous polyethylene film of 22 g/m on which the molten adhesive is directly applied from the melt, by spraying or by slot-die extrusion, and on which it is immediately adhered a spunbonded polypropylene nonwoven of 12 g/m. The peel strength measurement is done by recording the strength that is needed to debond the two adhered substrates, on a width of 50 mm.

iii. the adhesive property known in the field as "shear strength", i.e. the longest time during which two substrates, glued by the adhesive formulation under examination, are able to support, without breaking of the bond, a fixed weight that is hanging from them. Said adhesive property is measured according to the method ASTM D 3654, with the following modifications:

first substrate: Mylar film, 50 g/m$^2$
second substrate: kraft paper, 40 g/m$^2$
the adhesive is coated, by a manual lab coater, on the Mylar film from the melt at 170° C., at a basis weight of 50 g/m$^2$ and it is immediately bonded with the paper:
bonded area for test: 1 square inch (i.e. a square area of 1 inch per side)
weight: 1 kg
temperature of the testing chamber: 40° C.

For the Shear Strength test, the samples at time zero are tested immediately after having been manually adhered. On the contrary the samples at five days, are adhered and are then aged for five days in a room at 23° C. and 50% relative humidity, without being subjected to any weight. Once that the five days have passed, the aged samples are tested for the shear-strength, according to the procedures previously described.

Examples According to the Present Invention

The present invention is better illustrated by the following examples, which are given herein merely for the purpose of illustration and are not to be regarded as limiting the scope of the invention or the manner in which it can be practiced. Unless specifically indicated otherwise, parts and percentages are given by weight.

The Isotactic Metallocene Butene-1 Polymer Composition, at Low Viscosity and with a Bimodal Composition, Used in the Examples According to the Present Invention To formulate the Examples according to the present invention an isotactic metallocene butene-1 polymer composition has been used, at low viscosity and with a bimodal composition, directly obtained during polymerization, in two consecutive and separate reaction steps, according to what described above. Said bimodal isotactic polybutene-1 composition has been supplied by Basell Poliolefine Italia, and hereinafter it will be called Polymer PB-X1. It is characterized by the properties summarized in Table 1.

TABLE 1

|  |  | PB-X1 |
|---|---|---|
| Melt Flow Rate 190° C.- 2.16 kg-ISO 1133 | g/10 min. | 610 |
| Intrinsic viscosity (in THN) | dl/g | 0.49 |
| Total ethylene content (by weight) | % | 5.3 |
| Total ethylene content (by mole) | % | 10.1 |
| Ethylene content of component polymer A) (by mole) | % | zero |
| Ethylene content of component polymer B) (by mole) | % | 12.7 |
| 13C-NMR (mmmmm pentads) | % | 96.8 |
| Total xylene soluble at 0° C. | % | 80 |
| Mw | g/mol | 64,200 |
| Mn | g/mol | 29,000 |
| Mw/Mn global |  | 2.0 |
| Mw/Mn of soluble fraction |  | 1.7 |
| Mw/Mn of insoluble fraction |  | 1.8 |
| TmII | ° C. | 96 |
| Δ TmII | J/g | 5.5 |
| TmI | ° C. | 98 |
| Δ TmI | J/g | 22 |
| Glass Transition Temperature | ° C. | −25.8 |
| Brookfield viscosity at 180° C. | mPa · s | 18,000 |
| Density at 23° C. | g/cm³ | 0.892 |
| Tensile Stress at break | Mpa | 10 |
| Elongation at break | % | 560 |
| Hardness Shore D |  | 32 |
| Yellowness Index |  | −1 |

Example 1

The following hot-melt adhesive formulation, according to the present invention, has been prepared by mixing in the molten state the components at 170° C.:

| Ingredient | % by weight on the total weight of the adhesive formulation | Nature and Supplier |
|---|---|---|
| PB-X1 | 42.0 | See description above |
| Regalite R 1100 | 43.0 | Hydrocarbon tackifying resin, fully hydrogenated, supplied by da Eastman |
| Primol 352 | 13.0 | Paraffinic mineral oil supplied by ExxonMobil |
| Irganox 1010 | 2.0 | Antioxidant supplied by BASF |

The hot-melt adhesive formulation of Example 1, comprises, as its sole polymeric component, the previously described metallocene isotactic polymer composition PB-X1, at low viscosity, said polymer composition (as in Table 1 is illustrated in more details) being formed by a homopolymer of polybutene-1 and a copolymer between butene-1 and ethylene, both of them being metallocenic, isotactic and at low viscosity/low molecular weight, and moreover said polymer composition being directly obtained during polymerization, in two consecutive and separate reaction steps, according to the present invention.

The above illustrated adhesive formulation is easily processable, thanks to its particularly low viscosity, equal to 2,050 mPa·s at the temperature of 170° C. Furthermore it meets also the rheological criteria for being used even in processes at high speed and high shear-rate, like Spraying or Fiberization: in fact at 165° C., in correspondence with a value of its Elastic Modulus G' equal to 10 Pa, its Viscous Modulus G" has a value of 211 Pa, and therefore its Tan Delta has a value of 21.1, satisfying therefore the rheological criteria for a good sprayability of a hot-melt adhesive.

This formulation has a Ring & Ball Softening Temperature as low as 78° C. and an exceptionally long "open time" for formulations based on polybutene-1, and that is equal to 120 minutes; therefore its use is particularly easy and effective in the broadest variety of possible bonding processes.

This excellent combination of properties leads in fact to an excellent processability in different processes of application, and in different conditions of line speed and/or temperature. For instance the adhesive formulation of Example 1 has been processed in an optimum way by slot-die extrusion between the line-speeds from 250 m/minute to 600 m/minute, and between the temperatures from 155° C. to 165° C.; moreover it has been processed by Spraying between the line-speeds from 250 m/minute to 600 m/minute and between the temperatures from 155° C. to 170° C. In all cases the processability has been excellent, and the layer of adhesive, coated by extrusion or by Spraying, has always been fully homogeneous and regular.

In addition, the formulation of Example 1 shows an excellent ability of changing during time its own rheological, mechanical and adhesive properties, thanks to a crystallization, delayed in time, that is uncommonly good, ordered and robust, of the metallocene polymer composition of polybutene-1 PB-X1, isotactic and at low viscosity.

The surprising effectiveness of the crystallization, delayed in time, of said metallocene polymer composition of polybutene-1, is well expressed for instance by the increase, equal about to 64 times, of its Tensile Stress at Break at 23° C., that, from a value as low as 0.02 MPa at time zero, after five days of aging at 23° C., goes to a value as high as 1.3 MPa, therefore greater, in percentage terms, of as much as 6,400%; at the same time its Elongation at Break, that at time zero is greater than 4,040% (that is the highest full scale value measured by the used instrument), after five days at 23° C. falls to 333%, with a variation between the two times that (calculated with reference to the value at five days) is equal to more than 11.1 times, or also to more than 1,110%.

The unusual change that occurs, thanks to the crystallization delayed in time, inside the present hot-melt adhesive formulation, is well expressed also by the significant change in its rheological properties. For example the Elastic Modulus G', at time zero, at 23° C. and at the frequency of 1 Hz, has a very low value equal to 0.0687 MPa, while the rheological parameter Tan Delta is even greater than 1, and more precisely is equal to 1.18.

As every averagely skilled person in the sciences of Rheology and of adhesives, may easily understand, said values of these rheological parameters mean that the adhesive formulation of Example 1, in its solid state and at room temperature, immediately after having set from the melt, is a very soft and tacky adhesive, able to give since the beginning excellent adhesive bonds with substrates. Moreover the high value of Tan Delta at 23° C., means that said adhesive, after having formed the adhesive bond, and even if it is already in its solid state, may continue "to flow" and "to wet" very well the substrates, broadening the bonded area and therefore proportionally increasing the total adhesive strength.

However, the uncommon ability of this formulation of "hardening" during time, thanks to a crystallization delayed in time that is surprisingly effective and robust, is well highlighted by the changes that the same rheological parameters exhibit with a mere aging at room temperature, e.g. after five days. In fact, after five days of aging at 23° C., the Elastic Modulus G' at room temperature and at 1 Hz, has the very high value of 6.52 MPa; i.e. G', thanks to the crystallization that is surprisingly ordered, effective and robust, of the peculiar isotactic metallocene polymer compositions of polybutene-1, that form the polymeric basis of these novel hot-melt adhesives, has increased as much as 93.9 times, or also in percentage terms, of 9,390%.

Said exceptional increase of the Elastic Modulus G', well expresses how much the formulation of Example 1 has now spontaneously transformed into an extremely harder adhesive, that is more resistant versus the detachment, further reinforcing the adhesive and mechanical strength of the adhesive bonds formed since the beginning.

At the same time, also the parameter Tan Delta, thanks to the same phenomenon of crystallization, undergoes a significant decrease; in fact, after five days of aging at room temperature, Tan Delta has a value as low as 0.267, that is just typical of a much harder solid, that doesn't "flow" any more, this latest property of "flowing" being now not only no more requested, but possibly being even very detrimental, as it has been better explained in the previous text.

Therefore, thanks to the crystallization, that is particularly ordered and robust, of the peculiar new polymer composition of polybutene-1 used herein, the parameter Tan Delta of the adhesive formulation of Example 1, has, by a mere aging at room temperature for five days, a variation between the two times (calculated with reference to the value at five days) that is equal to more than 3.4 times, or also equal to about 342%.

Said unusual hardening by crystallization of the present adhesive, is well noticeable also in its outstanding change of the parameter Needle Penetration, that measures (in an inverse way to its value) how much an adhesive is soft and tacky, and therefore able to bond very well since the beginning; or vice versa how much it is hard and very resistant the detachment, for withstanding the breaking of the adhesive bond. In fact, the Formulation of Example 1 is at time zero a very soft and tacky substance, with a very high Needle Penetration at 23° C., as high as 125 dmm; but after five days it transforms into a much harder and resistant adhesive, with a Needle Penetration, still at 23° C., as low as 16 dmm. Therefore the adhesive, between the two times, changeses its Penetration (still calculated as percentage with reference to the value at five days) of more than 6.8 times, or also of 681%.

Finally, even if it is already partially clear from what written above, it is worthy to restate once again that the formulation of the present Example according to the invention, exhibits, with the progressing of its crystallization delayed in time at room temperature, a dramatic change in its surface tack; in fact this material, during its aging at 23° C., transforms from an adhesive that has a particularly high initial tack, into a final adhesive with no residual tack, a characteristic this one, that may be very important and valued in many applications.

Example 2

The following hot-melt adhesive formulation according to the present invention, has been prepared by melt-mixing at 170° C.:

| Ingredient | % by weight on the total weight of the adhesive formulation | Nature and Supplier |
| --- | --- | --- |
| PB-X1 | 42.0 | See description above |
| Vestoplast 702 | 8.0 | Amorphous-Poly-Alpha-Olefin polymer (APAO) supplied by Evonik |
| Regalite R 1100 | 35.0 | Hydrocarbon tackifying resin, fully hydrogenated, supplied by da Eastman |
| Primol 352 | 13.0 | Paraffinic mineral oil supplied by ExxonMobil |
| Irganox 1010 | 2.0 | Antioxidant supplied by BASF |

The above formulation employs, besides the low-viscosity metallocene polymer composition of polybutene-1 PB-X1, also a small quantity of an Amorphous-Poly-Alpha-Olefin (APAO).

This addition has been made essentially to further increase the initial tackiness of the formulation. However, differently from what taught by most prior art, said polymer, that is amorphous and chemically different from the metallocene polymer composition of butene-1, is herein used in a quantity that is much lower than the main polybutene-1, so as not to disturb its subsequent crystallization delayed in time, and the resulting improvement of the adhesive and mechanical properties, due to this crystallization that occurs in a particularly effective, ordered and robust way.

In spite of the presence of the amorphous polymer, different from the polybutene composition PB-X1, the formulation of Example 2 still exhibits a low viscosity, equal to 2,390 mPa·s at 170° C. Even more, it has an excellent processability, even in processes at high speed and high shear-rate, like processes of Spraying or Fiberization, as shown by the fact that at 165° C., in correspondence with a value of its Elastic Modulus G' equal to 10 Pa, its Viscous Modulus G" has a value of as much as 254 Pa, and its Tan Delta is therefore equal to 25.4, a very high value that shows the excellent fluidity and sprayability of this formulation, that fully satisfies the rheological criteria for a good sprayability of hot-melt adhesives.

The Ring & Ball Softening Temperature is equal to 84.2° C. and the open time is again unusually long, being about 45 minutes.

Like in the previous Example 1, also the formulation of Example 2 has shown an optimum processability in a broad range of different operative processes, and at different line-speeds and temperatures.

Also this formulation has been applied by slot-die extrusion between the line-speeds from 250 m/minute to 600 m/minute, and between the temperatures from 155° C. to 165° C.; and it has been processed also by Spraying between the line-speeds from 250 m/minute to 600 m/minute and between the temperatures from 155° C. to 170° C. In all cases the processability has been excellent, and the layer of adhesive, coated by extrusion or by Spraying, has always been fully homogeneous and regular.

Also this formulation of Example 2 undergoes with time, by aging at room temperature, a significant transformation of its adhesive, rheological and mechanical properties, that further improve its performances, thanks to the crystallization delayed in time of the novel polymer composition of polybutene-1, a crystallization that occurs with outstanding effectiveness, in spite of the presence of the amorphous polymer APAO.

In fact, for instance, the Tensile Stress at Break at 23° C. of this formulation, that, at time zero, has a value as low as 0.04 MPa, after five days of aging at room temperature, has the value of 1.36 MPa, i.e. as much as 34 times greater, or also, with an increase of as much as 3,300%; while the Elongation at Break, that at time zero is again greater than 4,040% (that is the highest full scale value measured by the used instrument), after five days falls to 287%, i.e. more than 14 times lower, or also, the Elongation at Break shows a change (calculated with reference to the final value at five days) equal to more than 1,300%.

Also the rheological properties in the solid state and at room temperature show an unexpected change in time. In fact for example the Elastic Modulus G', that at time zero, at 23° C. and at the frequency of 1 Hz, has a value as low as 0.055 MPa, after five days of aging at room temperature increases by the unexpected quantity of more than 86 times, or also of about 8,645%, at the value of 4.81 MPa; at the same time the parameter Tan Delta, measured in the same conditions, decreases from the high value of 0.984 at time zero, to the low value, after five days of aging at 23° C., of barely 0.2, with a change in time (calculated with reference to the value at five days) of about 4 times, or also of 392%. I.e. the formulation of Example 2 is a hot-melt adhesive that at the beginning, just after having set from the molten state, is a very soft and tacky material, that is able "to flow", in spite of its good cohesion, wetting very well the substrates and forming excellent initial adhesive bonds. However the peculiar optimum behavior in the subsequent crystallization, delayed in time, of the novel polymer composition of polybutene-1, used herein, is able to transform the adhesive formulation, through a mere aging in time at room temperature, in a much stronger and harder material, further improving the adhesive and mechanical properties.

Similarly the Needle Penetration at 23° C., changes from 28 dmm at time zero, to 12 dmm after five days, i.e. lower than more one half, with a change in time (calculated with reference to the value at five days) of 133%.

Like in the previous Example, also the hot-melt adhesive formulation of this Example 2, dramatically changes its own characteristics of surface tack, during the aging at room temperature, owing to the above described phenomena. Even in this case, this formulation transforms from an adhesive that at time zero is very tacky and can therefore immediately create excellent initial adhesive bonds, into a final adhesive after aging, that has no more any residual tack.

Example 3

The following hot-melt adhesive formulation, according to the present invention, has been prepared by melt-mixing at 170° C.:

| Ingredient | % by weight on the total weight of the adhesive formulation | Nature and Supplier |
|---|---|---|
| PB X1 | 47.0 | See description above |
| Regalite R1100 | 37.0 | Hydrocarbon tackifying resin, fully hydrogenated, supplied by da Eastman |
| Primol 352 | 13.0 | Paraffinic mineral oil supplied by ExxonMobil |
| Hifax CA 60 A | 1.0 | Heterophasic polymer composition of polypropylene and a copolymer of propylene and ethylene supplied by LyondellBasell |
| Irganox 1010 | 2.0 | Antioxidant supplied by BASF |

Also in this formulation, it has been done an addition of a very small quantity, equal to barely 1%, of a polymer that is different from the polymer composition of polybutene-1 PB-X1. In the present case however this different polymer is a heterophasic, semi-crystalline polymer, having a polypropilenic basis, and containing a fraction of propylene-ethylene copolymer.

The presence of this quantity, even as low as it is, of said semi-crystalline polymer, is capable of further improving the properties linked to the crystallization delayed in time, of the polymer composition PB-X1, without interfering with the excellent processability of this formulation, even in Spraying and Fiberization, and without modifying its very low viscosity.

In fact the viscosity at 170° C. is as low as 2,575 mPa·s; and, at 165° C., in correspondence with a value of its Elastic Modulus G' equal to 10 Pa, the Viscous Modulus G" of the present formulation has a value of as much as 332 Pa, therefore its Tan Delta being equal to as much as 33.2, and thus demonstrating an extraordinarily good satisfaction of the rheological criteria for an excellent sprayability of hot-melt adhesives.

Moreover, a Ring & Ball Softening Temperature as low as 83.7° C. and an unusually long open time of about 80 minutes, well express the ease and effectiveness by which the adhesive formulation of Example 3 can be used in a wide variety of application processes, even beyond the processes at high speed and high shear-rate like Spraying or Fiberization.

In fact, like in the two previous Examples, also the adhesive formulation of Example 3 has shown an optimum processability in a broad range of different operative processes, and at different line-speeds and temperatures.

As for the formulations of the two previous Examples, also this formulation has been applied by slot-die extrusion between the line-speeds from 250 m/minute to 600 m/minute, and between the temperatures from 155° C. to 165° C.; and it has been also processed by Spraying, between the line-speeds from 250 m/minute to 600 m/minute and between the temperatures from 155° C. to 170° C. In all cases the processability has been excellent, and the layer of adhesive, coated by extrusion or by Spraying, has always been fully homogeneous and regular It is optimal also its variation of properties, due to the crystallization delayed in time of the low-viscosity metallocene polymer composition of polybutene-1, that is comprised in the formulation of Example 3.

For instance, the Tensile Stress at Break at 23° C., that at time zero is as low as 0.04 MPa, after five days of aging at room temperature, grows to a value equal to as much as 1.72 MPa, with an outstanding increase of 42 times or also of 4,200%, that is due to the unusually ordered and robust crystallization of the novel metallocene polymer composition of isotactic polybutene-1, used herein.

At the same time, the Elongation at Break, that, at time zero, is again higher than 4,040%, after five days at 23° C., changes to 327%; i.e. the Elongation at Break undergoes, still for the uncommon robustness of the crystallization delayed in time of the peculiar novel metallocene polymer composition of polybutene-1, that is the polymeric basis of the present adhesive formulation, a variation in time and at room temperature that, in percentage terms, is equal to 1,135% (calculated with reference to the value at five days).

This significant change in the mechanical properties of this hot-melt adhesive, formulated according to the teachings of the present invention, is well noticeable also in the similar variations of rheological properties. For example, the Elastic Modulus G', that at time zero, at 23° C. and at the frequency of 1 Hz, has a value as low as 0.0676 MPa, thus evidencing that the present adhesive is, at the beginning, a very soft and tacky material, after barely five days of aging at room temperature, has the extremely higher value of 6.07 MPa; i.e. the slow crystallization at room temperature of the present hot-melt adhesive, that comprises one of the novel metallocene polymer compositions, with a bimodal composition, of isotactic polybutene-1, according to the present invention, is capable of increasing, after five days of aging at 23° C., the value of the Elastic Modulus G' by more than 88 times, or also by more than 8,879%.

At the same time the parameter Tan Delta, measured in the same conditions, decreases from the high value of 0.933 at time zero, to the much lower value of 0.296 again after five days of aging at 23° C.; i.e. Tan Delta shows a variation in time (calculated with reference to the value at five days) of more than two times, and more precisely of 215%, In the same period of time, the Needle Penetration changes from 37 dmm at time zero, to 11 dmm after five days, with a variation (calculated with reference to the value at five days) of 236%.

As for the adhesive formulations of Examples 1 and 2, even the hot-melt adhesive formulation of Example 3 shows, during its aging at room temperature and owing to the phenomena described above, a very strong variation of its surface tack.

In fact, also the present adhesive formulation at time zero is very tacky and it is capable of forming excellent immediate adhesive bonds with many substrates; but, during its aging, it transforms into an adhesive that eventually is fully tack-free, a characteristic that is very important and valued in many uses.

Comparative Examples

The below Comparative Examples are formulated by using, in place of an isotactic metallocene polymer composition of butene-1 at low viscosity, that has a substantially bimodal composition, directly obtained during polymerization, in two consecutive and separate reaction steps, according to what is taught by the present invention, a few old-generation Polybutenes-1 at high viscosity, synthesized with Ziegler-Natta catalysts, that are commercially available on the market; moreover in the below Comparative Examples, said polybutenes-1 from Ziegler-Natta catalysts, have been formulated into hot-melt adhesives according to the criteria and with the ingredients taught by the prior art.

Comparative Example 1

The below hot-melt adhesive of Comparative Example 1 has been prepared with commercial polybutenes-1 of old-generation, from Ziegler-Natta catalysts, and by using ingredients and formulation-related criteria, according to what was taught by the prior art. Said adhesive, that shows a very high viscosity, has been prepared by melt-mixing at 185° C.

| Ingredient | % by weight on the total weight of the adhesive formulation | Nature and Supplier |
|---|---|---|
| Polybutene-1 DP 8910 | 12.5 | Polybutene-1 copolymer with ethylene, from Ziegler-Natta catalyst, supplied by LyondellBasell |
| Polibutene-1 DP 0800 | 12.5 | Polybutene-1 homopolymer, from Ziegler-Natta catalyst, supplied by LyondellBasell |
| Rextac 2715 | 30.0 | Amorphous Poly-Alpha-Olefin polymer (APAO) supplied by Rextac Co. |
| Eastotac H 100-W | 25.0 | Hydrocarbon tackifying resin, fully hydrogenated, supplied by da Eastman |
| Epolene N15 | 19.5 | Homopolymeric polypropylene wax supplied by Westlake Chemical Co. |
| Irganox 1010 | 0.5 | Antioxidant supplied by BASF |

The Comparative Example 1 comprises a physical blend of two different polybutenes-1 of old-generation, obtained by mere melting and mixing. The first commercial polybutene-1 is a copolymer between butene-1 and ethylene, and the second one is a homopolymer of polybutene-1, both from Ziegler-Natta catalysts, and both at very high viscosity/molecular weight, synthesized by two fully independent reactions, and even commercialized as two separate polymers, that in this case have been physically blended by melting and mixing, just in the moment of the preparation of the present hot-melt adhesive formulation of Comparative Example 1.

Moreover, with the aim of somehow increasing the adhesivity and cohesion of the present formulation, this adhesive, according to what was taught by the prior art, comprises an unexpectedly high quantity (30% by weight) of an Amorphous-Poly-Alpha-Olefin (APAO), at a level even greater than the global level of the two polybutenes-1.

To try to improve the poor and qualitatively inadequate crystallization in time, at room temperature, of the present physical blend of two different polybutenes-1, both from Ziegler-Natta catalysts, the prior art also teaches to add an unusually high quantity (19.5% by weight) of a polypropylene wax, that has a very high level of crystallinity, whose objective is to act as nucleation and crystallization centers, for triggering and for trying to improve the insufficient and qualitatively inadequate crystallization, delayed in time, of the present two polybutenes-1 of Ziegler-Natta type.

However the introduction of a crystalline wax in such high quantities, causes various further drawbacks: for instance the open time of the present adhesive falls to unacceptably low levels, in this case as low as just 40 seconds, thus making difficult the application of this adhesive in a large variety of different processes that need much longer open times. As it is clear to every averagely skilled person in the science of hot-melt adhesives, this large addition of a crystalline wax makes the adhesive itself too hard and much less tacky, and other drawbacks better detailed below.

The adhesive formulation of Comparative Example 1, based on Ziegler-Natta type polybutenes-1 at high viscosity and high molecular weight, shows in fact even more severe drawbacks for its use as a hot-melt adhesive.

For instance, its Ring & Ball Softening Temperature is unacceptably high, equal to as much as 156.8° C.; this fact, combined with its very high viscosity, equal to as much as 9,660 mPa·s at 170° C., well says how much difficult, as it is well clear to every averagely skilled person in this science, it is to process and apply in a correct way this hot-melt adhesive, especially in processes and articles, as e.g. absorbent hygienic articles, that comprise several thermo-sensitive components, like polyethylene films and polyolefin nonwoven fabrics, that would be immediately damaged or even destroyed by adhesives applied at too high temperatures, as it would be indispensable to do with the adhesive formulation of Comparative Example 1.

Said very difficult processability of the above illustrated adhesive, is even more difficult in the most critical processes, at high speed and high shear-rate, like Spraying and Fiberization.

Actually the present adhesive at very high viscosity cannot be processed with these two processes.

For example, it does not satisfy by far the rheological criteria for a good sprayability of a hot-melt adhesive: in fact, at 165° C., in correspondence with a value of its Elastic Modulus G' equal to 10 Pa, its Viscous Modulus G" has a value as low as 133 Pa, and its Tan Delta is therefore equal to 13.3, a very low value for a molten hot-melt adhesive at high temperature, that clearly expresses its very poor fluidity and impossibility of being sprayed.

Even in application processes less critical than Spraying, the processability of this adhesive is in any case very poor. For instance, it has been tried to coat it on a polyethylene film by slot-die extrusion, at the relatively low speed of 250 m/minute, changing the temperature between 160° C. and 170° C., in order to look for the best conditions for having the best extrusion; even if it was possible to obtain samples of film coated with the adhesive (differently from what has been observed with the formulations of the other three Comparative Examples—see below), the quality of the adhesive layer coated on the film is in all cases unsatisfactory for regularity and uniformity.

The fact that the adhesive formulation of Comparative Example 1 is based on old-generation polybutenes-1, from Ziegler-Natta catalysts and at high viscosity, as well as the fact that it comprises such a very large quantity of an amorphous polymer as APAO Rextac 2715, impinges also upon a very low effectiveness of its crystallization at room temperature and delayed in time.

First of all, this fact is apparent from the values of its mechanical properties and from their changes during time, in aging at 23° C.

For instance, at time zero, its Tensile Stress at Break is equal to as much as 3.18 MPa; i.e., already at time zero, the formulation of Comparative Example 1, is a very hard solid that with difficulty may work as a good adhesive.

After five days of aging at room temperature, its Tensile Stress at Break at 23° C. increases a bit, for the delayed crystallization of the two polybutenes-1, contained herein. But said crystallization is so much inefficient, of poor quality and even disturbed by the massive quantity of amorphous polymer APAO, that the Tensile Stress at Break after five days increases only to 4.40 MPa, with a percent increase of just 38.4%.

Similarly, the Elongation at Break at 23° C.; that at time zero has the very low value of 220%, shows a very small variation after five days of aging at room temperature, passing to 193%, with a variation in time (calculated with reference to the value at five days) of as little as 14%.

The same phenomenon is even better shown by the trend during time, and at room temperature, of its rheological parameters.

For instance, the Elastic Modulus G' at 23° C. and at the frequency of 1 Hz, of the hot-melt formulation of Comparative Example 1, has at time zero the very high value of as much as 1.28 MPa, so confirming that this material is, since the beginning, a very hard, and little tacky adhesive, that—even owing to its very short open time of just only 40 seconds—is unable to form good and solid initial adhesive bonds.

This is even better reaffirmed by the value of its parameter Tan Delta, that at time zero, at 23° C. and still at the frequency of 1 Hz, is barely equal to 0.276, a very low value, that well expresses how this adhesive is poorly able to flow and to wet the substrates, therefore being unable to form good initial adhesive bonds.

The changes during time of these rheological parameters, because of the inefficient delayed crystallization, are also relatively small. For example, the Elastic Modulus G', at 23° C. and 1 Hz, after five days at room temperature, increases to 26.4 MPa; while the parameter Tan Delta, further decreases to the value of 0.219. Therefore G' shows a percent increase of 1,962% and Tan Delta shows a variation in time (calculated with reference to the value at five days) as low as 26%.

The above mentioned variations might look as significant, if considered in percentage terms, especially the variation of the Elastic Modulus G'.

However these changes, besides being significantly lower than the equivalent variations showed by the adhesive formulations according to the present invention, are somehow "useless"; in fact the initial adhesive bonds of poor quality that the hot-melt formulation of Comparative Example 1 has been able to form with substrates, owing to its excessive viscosity, its inadequate processability, its hardness since the initial moment, its poor wettability and flowability on substrates, are substantially not affected in a positive way nor they can increase their strength because of the increase of the Elastic Modulus G' or of the decrease of Tan Delta, owing to the absence of an intimate and good contact between the adhesive and the substrates, as a consequence of the above mentioned deficiencies in the initial behavior of the present adhesive.

Even the Needle Penetration of the formulation of Comparative Example 1, varies relatively little, owing to the crystallization, unsatisfactory both qualitatively and quantitatively, of the polybutenes-1 from Ziegler-Natta catalysts comprised in said formulation. In fact the Needle Penetration at 23° C., that initially is as low as 6 dmm (confirming how much this formulation is a very hard and very little tacky material), changes to 3 dmm, after five days of aging at room temperature. Even if this value is formally, in percentage term, 100% lower (calculated with reference to the value after five days), however it consists of an insignificant variation in absolute terms of as low as 3 dmm, that is practically fully negligible Comparative Example 2

The following comparative hot-melt adhesive has been prepared by using commercial polybutenes-1 from Ziegler-Natta catalysts and according to the teachings of the prior art.

Because of its exceptionally high viscosity, the below showed adhesive has been prepared by melt-mixing at 185° C.

| Ingredient | % by weight on the total weight of the adhesive formulation | Nature and Supplier |
|---|---|---|
| Polybutene-1 DP 8911 | 30.0 | Polybutene-1 copolymer with ethylene, from Ziegler-Natta catalyst, supplied by LyondellBasell |
| Polybutene-1 PB 0800 | 20.0 | Polybutene-1 homopolymer, from Ziegler-Natta catalyst, supplied by LyondellBasell |
| Escorez 5380 | 49.5 | Hydrocarbon tackifying resin, fully hydrogenated, supplied by da ExxonMobil |
| Irganox 1010 | 0.5 | Antioxidant supplied by BASF |

Even in this case, following the teachings of the prior art, it has been used a physical blend of two different commercial polybutenes-1, both from Ziegler-Natta catalysts, that have been physically mixed together in the molten state, just in the moment when the hot-melt adhesive has been prepared. These polybutenes-1 are a copolymer of butene-1 and about 6% ethylene, and a homopolymer of polybutene-1, that were blended in a weight ratio of 60:40.

The only additional ingredient, besides the antioxidant, according to this teaching of prior art, is a hydrogenated hydrocarbon tackifying resin.

The hot-melt adhesive of Comparative Example 2 shows even more drawbacks than the previous Comparative Example 1, in particular for what concerns an extremely high viscosity, a very poor processability in processes both at low speed and—even more—at high speed, bad rheological properties, and therefore the impossibility to work as a good hot-melt adhesive.

Moreover the changes of its properties during time, due to the inefficient crystallization of the physical blend of the two polybutenes-1 from Ziegler-Natta catalysts, are they too fully unsatisfactory.

For instance the Ring & Ball Softening temperature is high and equal to 112.8° C.; and its viscosity in the molten state is amazingly high for a hot-melt adhesive, being equal to as much as 50,200 mPa·s at 170° C.

Both these two parameters well say that the adhesive according to the Comparative Example 2 has a very difficult processability, and first of all is absolutely not suitable for being used in the manufacturing of articles, like absorbent hygienic articles, that comprise thermo-sensitive materials, as polyolefin plastic films and polyolefin nonwovens.

Obviously the present adhesive, with such physical characteristics, is fully not processable especially in processes at high speed, like Spraying and Fiberization; in fact for example, at 165° C. and, in correspondence with a value of its Elastic Modulus G' equal to 10 Pa, the hot-melt adhesive of Comparative Example 2 has a very low Viscous Modulus G" equal to as low as 105 Pa; in other words its Tan Delta in the molten state, at 165° C., is equal only to 10.5, in such a way that it largely does not meet the rheological criteria for a good sprayability of a hot-melt adhesive.

Because of its very high viscosity and its poor rheological characteristics, it is not processable even with processes that are less critical than Spraying, e.g. by slot-die extrusion. In fact all attempts to extrude it as an adhesive coating on a polyethylene film, even at the relatively low speed of 250 meters/minute, and even by changing the temperature between 155° C. and 170° C., have failed.

Moreover even its very short open time, i.e. the time during which this adhesive is capable of adhesively bonding a substrate, and that is equal only to 110 second, shows how it is impossible to use the adhesive formulation of Comparative Example 2 in a variety of industrial processes for which much longer open times are requested.

At time zero, its Tensile Stress at Break at 23° C. is relatively high for an adhesive, and equal to 0.34 MPa; and its Elongation at Break is equal to 2,640%. This adhesive is therefore a relatively elastic material but it's hard, and with difficulty it might work as a good adhesive.

After five days of aging at 23° C., the Tensile Stress at Break at room temperature increases to 6.59 MPa, i.e. with a percent increase of 1,838%; and the Elongation at Break decreases to 247%, with a percent variation (calculated with reference to the value at five days) of 969%.

These variation values might seem high values, but actually, besides being significantly worse than the equivalent variations showed by the formulations according to the present invention, as a matter of fact and as already clarified in the previous Comparative Example 1, these variations in time of the mechanical properties are fully ineffective in theoretically improving an adhesive bond that actually is weak since the beginning, due to the poor ability of the present adhesive of wetting the substrates and of strongly adhering since time zero, with a broad and robust contact.

As it is clear to every averagely skilled person in the science of hot-melt adhesives, this fact is even more apparent when examining the rheological properties of the present adhesive, not only in the molten state (see above), but also at room temperature, and by analyzing the changes in time of these rheological properties, through aging at 23° C.

At time zero, the above mentioned adhesive has at 23° C. and at the frequency of 1 Hz, an Elastic Modulus G' that has the enormous value of 4.915 MPa, while its Tan Delta is just equal to 0.57. These values say that the formulation of Comparative Example 2 is, since the beginning, a very hard and little tacky adhesive, with a poor ability of well wetting and well adhering on a substrate.

After five days of aging at room temperature, the Elastic Modulus G', at 23° C. and 1 Hz, has a value of 20.58 MPa, with a relatively limited increase of less than 319%; its Tan Delta, still at 23° C. and 1 Hz, has a value equal to 0.447, with a negligible percent change (calculated with reference to the value at five days) as little as 27.5%.

Both these two percent changes in time of the main rheological parameters, well express the scarce effectiveness of the crystallization delayed in time, that can occur in the formulation of Comparative Example 2.

In addition, its initial hardness and the insufficient variation of its properties during time, is apparent also in the values and in the change of the Needle Penetration at 23° C. of this adhesive. Its Needle Penetration is equal to 3 dmm at time zero (a value that identifies a very hard and fully non-tacky adhesive) and it remains still 3 dmm, without any variation, even after five days of aging at room temperature Comparative Example 3

The below showed comparative hot-melt adhesive has been prepared, by melt-mixing at 185° C., and by using a commercial polybutene-1 from Ziegler-Natta catalysts, according to the teachings of the prior art.

| Ingredient | % by weight on the total weight of the adhesive formulation | Nature and Supplier |
|---|---|---|
| Polibutene-1 DP 8910 | 50.0 | Polybutene-1 copolymer with ethylene, from Ziegler-Natta catalyst, supplied by LyondellBasell |
| Eastotac H 100-W | 15.0 | Hydrocarbon tackifying resin, fully hydrogenated, supplied by da Eastman |
| Indopol H-100 | 15.0 | Poly-iso-butylene liquid plasticizer supplied by Ineos |
| Epolene N15 | 19.5 | Homopolymeric polypropylene wax supplied by Westlake Chemical Co. |
| Irganox 1010 | 0.5 | Antioxidant supplied by BASF |

Given the above unsatisfactory results obtained from physical blends of two polybutenes-1, according to the previous Comparative Examples and according to what taught by the prior art, the Comparative Example 3 prepares, again according to the teachings and ingredients of the prior art, an adhesive formulation by using, as the only polymeric component, at high molecular weight, one copolymer of butene-1 with ethylene, still of Ziegler-Natta type.

As already previously noted, it is worthy to emphasize that the liquid poly-iso-butylene, herein used with the function of a plasticizer, is a material that is completely different, both from the chemical and structural standpoint, from polybutene-1.

In spite of the addition of massive quantities of plasticizers, waxes and tackifying resins, ingredients all at low molecular weight and low viscosity, the global viscosity in the molten state of the above written formulation, still remains excessively high, and equal to 15,370 mPa·s at 170° C., while the Ring & Ball Softening Temperature is very high and equal to 157° C.

As it can be expected from a material with such a high viscosity, the rheological criteria for a good sprayability are not satisfied, because, at 165° C., and in correspondence with a value of its Elastic Modulus G' equal to 10 Pa, the Viscous Modulus G" of the adhesive formulation of this Comparative Example 3, has a value of only 163 Pa; or also, its Tan Delta has the low value of 16.3.

Therefore the rheological criteria for a good sprayability are absolutely not met; in fact all the attempts for applying it by Spraying, at temperatures between 160° C. and 170° C., have failed.

Like in the case of the previous Comparative Example, the formulation of the present Comparative Example is not even processable by application processes less critical than Spraying. Also in this case it has been tried to extrude this formulation by slot-die, as an adhesive coating on a polyethylene film, at the relatively low speed of 250 m/minute, and at temperatures variable between 160° C. and 170° C.; but also in the present case, all attempts have failed.

Even its open time is again excessively short, and equal only to 60 seconds, which fact confirms the difficulty in applying this adhesive and in forming good and strong adhesive bonds, since the initial contact with the substrates.

The mechanical properties are still the ones of a very hard and very little tacky adhesive: in fact the Tensile Stress at Break at 23° C. has, at time zero, a surprisingly high value for an adhesive, as much as 3.94 MPa, and the initial Elongation at Break is as low as 420%.

The change in time of these mechanical properties of the adhesive is small, showing how, inside this formulation based on a Ziegler-Natta type polybutene-1, the crystallization delayed in time occurs in an unsatisfactory way, both from a quantitative and qualitative standpoint.

In fact, after five days of aging at 23° C., the Tensile Stress at Break at room temperature increases to 4.15 MPa, with a percent increase as small as 5%. On the contrary the Elongation at Break decreases to the value of 240%, with a percent decrease (calculated with reference to the value at five days) of only 75%.

Also the rheological parameters confirm said scarce qualities as an adhesive, and especially as an adhesive that crystallizes in time, of the hot-melt formulation of Comparative Example 3.

In fact, already at time zero, at room temperature and at the frequency of 1 Hz, its Elastic Modulus G', that is directly proportional to the hardness of the adhesive, has a very high value equal to as much as 2.89 MPa; and the parameter Tan Delta, in the same conditions, has a value as low as 0.238.

Owing to the poor crystallization in time of the Ziegler-Natta polybutene-1, contained herein, and in spite of the presence of massive quantities of a polypropylene wax that works as a crystallization nucleating agent, after five days at 23° C., the Elastic Modulus G' at room temperature and 1 Hz, has increased just to 2.94 MPa, with a percent increase as low as 1.7%.

At the same time, the parameter Tan Delta, measured under the same conditions, has decreased to 0.127 with a percent change (calculated with reference to the value at five days) of 87.4%.

Similarly, the Needle Penetration at 23° C., that at time zero has a very low value of 6 dmm, because of the excessive initial hardness of the present adhesive, after five days of aging at room temperature, changes, to 5 dmm, with a practically negligible variation in absolute terms.

Comparative Example 4

The following comparative hot-melt adhesive has been prepared, by melt-mixing at 170° C., and by using a commercial polybutene-1 from Ziegler-Natta catalysts, and with ingredients and teachings according to the prior art.

| Ingredient | % by weight on the total weight of the adhesive formulation | Nature and Supplier |
|---|---|---|
| Polybutene-1 DP 8910 | 25.0 | Polybutene-1 copolymer with ethylene, from Ziegler-Natta catalyst, supplied by LyondellBasell |
| Escorez 1310 | 50.0 | Aliphatic hydrocarbon tackifying resin supplied by ExxonMobil |
| Indopol H-100 | 24.5 | Poly-iso-butylene liquid plasticizer supplied by Ineos |
| Irganox 1010 | 0.5 | Antioxidant supplied by BASF |

Because the main drawbacks, highlighted in the previous Comparative Examples, were a bad processability, due to excessively high viscosities, and an unsatisfactory crystallization of the adhesive in time, the adhesive formulation of Comparative Example 4 has been formulated so to have an unusually low viscosity, compared to what is generally taught by prior art.

This objective has been achieved by using a particularly low percent content of a copolymer of butene-1 and ethylene, synthesized with a Ziegler-Natta catalyst, combined with massive quantities of a plasticizer and of a tackifying resin, both at low molecular weight.

Actually a few parameters of the adhesive formulation of Comparative Example 4 seem to be a bit more similar to some optimum characteristics of the adhesive formulations according to the present invention.

For instance, the viscosity at 170° C. is much lower than the one of all the previous comparative examples, and it is equal to 2,650 mPa·s; even the Ring & Ball Softening Temperature is lower and equal to 77° C.

Even the open time is much longer than the previous comparative examples, and it is equal to 15 minutes, a value this one that is anyhow insufficient for giving to the present formulation a good processability in a wide range of processes that require much longer open times.

However, in spite of its very low viscosity, similar to the viscosity of the Examples according to the present invention, the adhesive formulation of Comparative Example 4—owing essentially to the Ziegler Natta type polybutene-1 at very high molecular weight contained in it—is not processable by Spraying; and all the attempts done between the temperatures of 155° C. and 170° C. have failed. This is confermed also by its rheological parameters: in fact at 165° C., in correspondence with a value of its Elastic Modulus G' equal to 10 Pa, its Viscous Modulus G" has a value as low as 180 Pa, i.e. its Tan Delta has a value of only 18, therefore not meeting the minimum requirements of the rheological criteria for a an acceptable sprayability.

In a rather surprising way, especially owing to its low viscosity, the adhesive formulation of Comparative Example 4 has shown a very poor processability even by slot-die extrusion, and at the relatively low speed of 250 m/minute.

All the attempts to extrude with this formulation an adhesive coating on a polyethylene film, between the temperatures of 155° C. and 165° C., have failed.

In fact the material, even if it has such a very low viscosity, is extruded in a very irregular and not uniform way, with a variable flow at the extrusion die, that is pulsating and forms waves in the flow itself. Because of this, the extruded adhesive gathers in big drops only in some areas of the substrate, therefore demonstrating its inability to give a good and stable adhesive bond between substrates.

Moreover, the polybutene-1 copolymer, from Ziegler-Natta catalysts, having a high molecular weight and a high viscosity, used herein, is unable to withstand the "dilution", that for such a type of polymer is an excessive dilution, with plasticizers and resins at low molecular weight, without an unacceptable worsening of the variation in time of the adhesive, mechanical and rheological properties, because of the crystallization of polybutene-1.

For example, about the mechanical properties, the adhesive of this Comparative Example, is at the beginning very soft, with a Tensile Stress at Break at 23° C. as low as 0.04 MPa; but after aging for five days at room temperature, owing to the scarce ability of the Ziegler-Natta type polybutene-1 copolymer of having a sufficiently robust and "perfect" crystallization (especially in such diluted conditions, herein used only for being able to lower the adhesive viscosity to acceptable levels), shows a Tensile Stress at Break at 23° C. that is barely equal to 0.56 MPa, therefore with an insufficient percent increase of 1,300%.

Given the softness of the present adhesive, its Elongation at Break at time zero is high, and it exceeds the highest full scale value measured by the used instrument; it is thus greater than 4,040%, in a behavior that looks apparently similar to some previously illustrated formulations according to the present invention.

However the scarce effectiveness of the crystallization, delayed in time, of the Ziegler-Natta type polybutene-1, used herein, leads to the fact that, after aging for five days at room temperature, the Elongation at Break remains still high and equal to 1.000%, therefore with a percent change in time (calculated with reference to the value at five days) equal only to 304%.

Said behavior is apparent also in the values of the rheological parameters, and in their changes for aging at room temperature. For instance, at time zero, at 23° C. and at the frequency of 1 Hz, the Elastic Modulus G' of the adhesive formulation of Comparative Example 4, has the very low value of 0.041 MPa, and in the same conditions its Tan Delta has a value of 2.33.

After five days of aging at room temperature, even if Tan Delta has an unexpectedly large variation in time, after five days it has in fact the value of 0.739 and therefore it has a variation (calculated with reference to the value at five days) of about 215%, the same does not happen for the Elastic Modulus G' at room temperature, whose value directly expresses the "hardening due to the crystallization" of the adhesive formulation. In fact, after five days at 23° C., the Elastic Modulus, at 23° C. and at the frequency of 1 Hz, of the adhesive formulation of the Comparative Example 4, has still a low value, equal to 0.477 MPa; therefore its variation has been limited and equal only to 1,063%.

This demonstrates how the adhesive formulation of the Comparative Example 4, is a very soft material, at time zero, that however, substantially remains soft even during an aging in time. i.e. it undergoes a crystallization delayed in time, of the old-generation Ziegler-Natta type polybutene-1 comprised herein, that is unsatisfactory, from the standpoint both of the quantity and quality of the formed crystals.

This happens because both of the intrinsically inferior characteristics of crystallizability of the polybutene-1, at high molecular weight, synthesized with Ziegler-Natta catalysts, used herein; as well as because of the dilution with massive quantities of plasticizers and resins at low molecular weight, added herein for obtaining a global melt viscosity that is acceptably low, but that, for this type of Ziegler-Natta polybutene-1, causes an excessive dilution, that further worsens the already poor-quality characteristics of crystallization delayed in time.

The Needle Penetration at 23° C., that at time zero has a value of 119 dmm, after aging for five days at room temperature, reaches a still relatively high value of 22 dmm, with a percent variation in time (calculated with reference to the value at five days) equal to 441%.

Example of Adhesive Properties

In Tables 2, 3 and 4 are reported a few values of the adhesive parameters Peel Strength and Shear Strength, measured according to what previously said, both at time zero and after a five days aging at the temperature of 23° C. and at a relative humidity of 50%. The values are reported for all the three Examples according to the present invention, and for one of the Comparative Examples, in the only case in which it has been possible to process and apply the adhesive in a sufficiently regular and uniform way, and only by slot-die extrusion.

TABLE 2

Peel Strength on samples prepared by Spraying
Spraying temperature: 165° C.
Line speed: 250 m/minute
Basis weight of applied adhesive: 1.5 g/m²

| FORMULATION | Peel Strength at time zero (N/50 mm) | Peel Strength at five days (N/50 mm) | % increase |
| --- | --- | --- | --- |
| Example 1 | 0.1 | 0.98 | 880% |
| Example 2 | 0.14 | 1.32 | 843% |
| Example 3 | 0.08 | 0.46 | 475% |
| Comparative example 1 | not processable | | |
| Comparative example 2 | not processable | | |
| Comparative example 3 | not processable | | |
| Comparative example 4 | not processable | | |

TABLE 3

Peel Strength on samples prepared by slot-die extrusion
Extrusion temperature: 165° C.
Line speed: 250 m/minute
Basis weight of applied adhesive: 1.5 g/m²

| FORMULATION | Peel Strength at time zero (N/50 mm) | Peel Strength at five days (N/50 mm) | % increase |
| --- | --- | --- | --- |
| Example 1 | 1.29 | 2.05 | 59% |
| Example 2 | 0.81 | 1.17 | 44% |
| Example 3 | 0.75 | 1.52 | 103% |
| Comparative example 1 | 0.1 | 0.1 | — |
| Comparative example 2 | not processable | | |
| Comparative example 3 | not processable | | |
| Comparative example 4 | not processable | | |

In spite of the very low quantity of applied adhesive, equal only to 1.5 g/m², both by Spraying and by slot-die extrusion, the formulations of the Examples according to the present invention, show not only values of peel-strength that are adequate to the intended use, e.g. inside hygienic absorbent articles, but show first of all a significant increase in time, that occurs by mere aging at room temperature, thanks to the optimum crystallization delayed in time of the isotactic metallocene butene-1 polymer composition, at low viscosity and with a bimodal composition, comprised herein.

On the contrary, the comparative formulations, based on old-generation Ziegler-Natta type polybutenes-1, at high molecular weight and high viscosity, are in general not processable in a correct way, both by Spraying and by slot-die extrusion, even at the relatively low speed equal to 250 m/minute, with the exception, for this latest application technology, of the Comparative Example 1. But even in this case, it has a low peel-strength, that even more does not show any increase with time.

By the way, it is worthy here to clarify that the values of peel strength at time zero, even if not critical for the final use, are greater for the application by slot-die extrusion compared with the ones by Spraying, because, in addition to the rheological properties of the adhesives according to the present invention, that anyhow favor an intimate contact and wetting of the film and a partial penetration between the nonwoven's fibers, in the case of the application by slot-die extrusion, the physical contact and pressure with the extrusion-head aid a further penetration and therefore a higher adhesion even at time zero.

TABLE 4

Shear Strength on samples prepared by lab manual coater
Application by lab manual coater from melt at 170° C.
Quantity of applied adhesive: 50 g/m²

| FORMULATION | Shear Strength a time zero (minutes) | Shear Strength at five days (minutes) |
| --- | --- | --- |
| Example 1 | 0.2 | >720 |
| Example 2 | 0.4 | >720 |
| Example 3 | 0.7 | >720 |
| Comparative example 1 | >720 | >720 |
| Comparative example 2 | >720 | >720 |
| Comparative example 3 | >720 | >720 |
| Comparative example 4 | 0.7 | 120 |

The shear-strength data, between time zero and five days, show in a particularly evident way, the outstanding effectiveness of the crystallization delayed in time, of the formulations of the Examples according to the present invention.

Although at time zero, as already seen from the mechanical and rheological parameters, these formulations are very soft and tacky materials, at low viscosity, therefore not suitable to pass a shear-strength test in particularly severe conditions, under a load of as much as 1 kg and even more at the temperature of 40° C., after an adequate aging of five days, said adhesives are capable of withstanding this type of shear-strength test for more than twelve hours.

On the contrary, the formulations of the Comparative Examples, can be divided into two groups. The first group is the group of the formulations of the first three Comparative Examples, that are all excessively viscous materials, such to have a very difficult and even practically impossible processability, apart from using a lab manual application.

Given such characteristics, they pass since time zero the shear-strength test at twelve hours; but then they do not show any further significant increase with time.

On the contrary, the formulation of Comparative Example 4 demonstrates how, by using Ziegler-Natta type polybutenes-1, and trying to lower the viscosity to acceptable levels through the addition of massive quantities of plasticizers and resins, the behavior at time zero is apparently similar to the one of the formulations according to the present invention; but then, the poor effectiveness of the delayed crystallization of such Ziegler-Natta polybutenes-1, causes that the shear-strength, in the shown conditions, of this material, aged for five days, reaches at the upmost just two hours.

The invention claimed is:

1. Hot-melt adhesive formulation, characterised in that it comprises:
   a) an isotactic butene-1 polymeric metallocene composition having a melt flow rate (MFR) ranging between 400 and 2,000 g/10 minutes, measured at 190° C. and under a weight of 2.16 kg, which has a bimodal-type composition comprising:
   A) an isotactic butene-1 homopolymer or a butene-1 isotactic copolymer with one or more comonomers, selected from ethylene and alpha-olefins with a number of carbon atoms equal to or greater than three, said homopolymer or copolymer A, having a comonomer copolymerised content ($C_A$) not greater than 5% by mole;
   B) a butene-1 isotactic copolymer with one or more comonomers selected from ethylene and alpha-olefins with a number of carbon atoms equal to or greater than three, said copolymer B, having a comonomer copolymerized content ($C_B$) between 6% and 25% by mole;
   Such polymeric compound has a total content of copolymerised comonomer, referring to the sum of A) plus B), between 4% and 18% by mole; and
   b) at least one viscosity modifier which is not solid at room temperature.

2. Hot-melt adhesive formulation according to claim 1, wherein the copolymer A has a copolymerised comonomer content ($C_A$) not greater than 4% by mole.

3. Hot-melt adhesive formulation according to claim 1, wherein the copolymer B has a copolymerized comonomer content ($C_B$) between 8% and 20% by mole.

4. Hot-melt adhesive formulation according to claim 1, wherein the butene-1 polymeric metallocene composition has a total content of copolymerised comonomer, referring to the sum of A) plus B), between 5% and 15% by mole.

5. Hot-melt adhesive formulation according to claim 1, wherein the butene-1 polymeric metallocene composition has a content of fraction soluble in xylene at 0° C. of not less than 65% by weight, referring to the total weight of A) plus B).

6. Hot-melt adhesive formulation according to claim 5, wherein the butene-1 polymeric metallocene composition comprises between 10% and 40% by weight of A) and between 60% and 90% by weight of B), referring to the total weight of A) plus B).

7. Hot-melt adhesive formulation according to claim 1, wherein the butene-1 polymeric metallocene composition has a content of fraction soluble in xylene at 0° C. not greater than 60% by weight, referring to the total weight of A) plus B).

8. Hot-melt adhesive formulation according to claim 7, wherein the butene-1 polymeric metallocene composition comprises between 35% and 65% by weight of A) and between 35% and 65% by weight of B), referring to the total weight of A) plus B).

9. Hot-melt adhesive formulation according to claim 1, wherein the butene-1 polymeric metallocene composition has a global melting enthalpy (ΔH TmII) ranging between 3 and 20 J/g, measured with a temperature scanning ramp of 10° C./minute.

10. Hot-melt adhesive formulation according to claim 1, wherein the butene-1 polymeric metallocene composition has a melting point of the crystalline form I (TmI) of not less than 60° C.

11. Hot-melt adhesive formulation according to claim 1, wherein the butene-1 polymeric metallocene composition has a viscosity ranging between 5,000 and 50,000 mPa·s, measured at 180° C.

12. Hot-melt adhesive formulation according to claim 1, wherein the butene-1 polymeric metallocene composition has a polydispersity index not greater than 4.

13. Hot-melt adhesive formulation according to claim 1, wherein the butene-1 polymeric metallocene composition has a Mw value of not less than 30,000.

14. Hot-melt adhesive formulation according to claim 1, wherein the butene-1 polymeric metallocene composition has a glass transition temperature not greater than −22° C.

15. Hot-melt adhesive formulation according to claim 1, wherein the butene-1 polymeric metallocene composition has a yellow index which is less than zero.

16. Hot-melt adhesive formulation according to claim 1, which has a Brookfield viscosity measured at a temperature of 170° C. which is not greater than about 5,000 mPa·s.

17. Hot-melt adhesive formulation according to claim 1, which, after solidification by cooling from 170° C. to 23° C., has an open time of not less than 10 minutes.

18. Hot-melt adhesive formulation according to claim 1, which has a Ring & Ball softening temperature not greater than about 120° C.

19. Hot-melt adhesive formulation according to claim 1, wherein the isotactic butene-1 polymeric metallocene composition constitutes from about 10% by weight to about 85% by weight of said hot-melt adhesive formulation.

20. Hot-melt adhesive formulation according to claim 1, wherein the viscosity modifier, which is not solid at room temperature, is selected from paraffinic mineral oils; naphthenic mineral oils; paraffinic and naphthenic hydrocarbons which are non-solid at room temperature, and mixtures thereof; oligomers which are non-solid at room temperature of polyolefins and their copolymers, such as non-solid oligomers derived from ethylene, propylene, butene, isobutylene, copolymers thereof and the like; plasticizers which are non-solid at room temperature, formed by esters, such as phthalates, benzoates, sebacates; vegetable oils; natural and synthetic fats; and mixtures thereof.

21. Hot-melt adhesive formulation according to claim 20, wherein the viscosity modifier, which is not solid at room temperature, is a metallocene oligomer of polypropylene or a metallocene oligomer of a propylene-ethylene copolymer, wherein the propylene is the predominant comonomer as molar fraction.

22. Hot-melt adhesive formulation according to claim 21, wherein the viscosity modifier is a propylene-ethylene metallocene copolymer, with a predominant molar content of propylene, and which has a softening temperature not greater than −30° C. and a viscosity at 170° C. not greater than 300 mPa·s.

23. Hot-melt adhesive formulation according to claim 20, wherein the viscosity modifier which is not solid at room temperature or a mixture of viscosity modifiers which are not solid at room temperature, constitute from about 5% by weight to about 40% by weight of said formulation.

24. Hot-melt adhesive formulation according to claim 1, which also comprises at least one tackifier resin.

25. Hot-melt adhesive formulation according to claim 24, wherein the tackifier resin or the mixture of tackifying resins, has a Ring & Ball softening temperature of not less than 80° C.

26. Hot-melt adhesive formulation according to claim 24, wherein the tackifier resin or a mixture of tackifying resins constitutes from about 15% by weight to about 70% by weight of said formulation.

27. Hot-melt adhesive formulation according to claim 24, wherein the tackifier resin is selected from aliphatic hydrocarbon resins and derivatives of aliphatic hydrocarbon resins; aromatic hydrocarbon resins and derivatives of aromatic hydrocarbon resins; aliphatic/aromatic hydrocarbon resins and derivatives of aliphatic/aromatic hydrocarbon resins; polyterpenes and modified terpene resins and derivatives of polyterpenes and modified terpene resins; rosins, esters thereof and derivatives of rosins, esters; and mixtures thereof.

28. Hot-melt adhesive formulation according to claim 1, which also includes not more than 5% by weight of a wax.

29. Hot-melt adhesive formulation according to claim 28, wherein the wax is a polypropylene wax or a polypropylene wax modified with maleic anhydride, and that have a softening point of not less than 120° C.

30. Hot-melt adhesive formulation according to claim 1, which comprises not more than 15% by weight of a chemically different polymer from the butene-1 polymeric metallocene composition or from one of its components.

31. Hot-melt adhesive formulation according to claim 30, wherein said polymer is a semi-crystalline copolymer of propylene with ethylene or a semi-crystalline polymer composition of polypropylene and a copolymer of propylene and ethylene.

32. Hot-melt adhesive formulation according to claim 31, wherein said copolymer or said polymeric composition has a heterophasic morphology.

33. Hot-melt adhesive formulation according to claim 1, which also includes not more than 15% by weight of a homopolymer or copolymer of metallocene isotactic polybutene-1, having a monomodal composition and a melt flow rate (MFR) at 190° C. between 200 and 2,000 g/10 minutes.

34. Hot-melt adhesive formulation according to claim 1, which, at the temperature of 165° C. and in correspondence with a value of its Elastic Modulus G' equal to 10 Pa, has a value of its Viscous Modulus G" that is not smaller than 200 Pa.

35. Hot-melt adhesive formulation according to claim 1, which, when it is solidified from the molten state, passing from 170° C. to 23° C., has, at room temperature and at a time not longer than 120 minutes from its solidification (defined as "time zero"), a Tensile Stress at Break at time zero not greater than about 0.25 MPa; and which, after five days of aging at 23° C., has a Tensile Stress at Break at 23° C. between about 0.7 MPa and about 2.5 MPa, and in any case greater, in percentage terms, than at least about 1,500%.

36. Hot-melt adhesive formulation according to claim 1, which, at room temperature and at time zero, has an Elongation at Break not lower than about 500%; and which, after five days of aging at 23° C., has an Elongation at Break at 23° C. between about 100% and about 700% as the absolute value, and in any case lower in percentage terms, as percent variation with regard to time zero, of at least about 500% less, as a percent variation calculated with reference to the value after five days.

37. Hot-melt adhesive formulation according to claim 1, which, at time zero at 23° C. and at the frequency of 1 Hz, has an Elastic Modulus G' not greater than about 1 MPa; and which, after five days of aging at 23° C., has an Elastic Modulus G', measured at 23° C. and at the frequency of 1 Hz, between about 2 MPa and about 10 MPa, and in any case greater, in percentage terms, than at least about 2,000%, with reference to the value of the same parameter at time zero.

38. Hot-melt adhesive formulation according to claim 1, which, at time zero at 23° C. and at the frequency of 1 Hz, has a Tan Delta not lower than about 0.25; and which, after five days of aging at 23° C., has a Tan Delta, at 23° C. and at the frequency of 1 Hz, between about 0.1 and about 0.4, and in any case such to show a decrease in percentage terms of at least about 100%, with reference to the value at time zero, said percent decrease being calculated with regard to the value at five days.

39. Hot-melt adhesive formulation according to claim 1, which, at time zero and 23° C., has a Needle Penetration not lower than 10 dmm; and which, after five days of aging at 23° C., has a Needle Penetration at 23° C. between about 3 dmm and about 18 dmm, and in any case with a variation of at least 10 dmm as the absolute value, with reference to the value at time zero.

40. Hot-melt adhesive formulation according to claim 1, which, after having been aged for five days at 23° C. and 50% relative humidity, has a Peel Strength not lower than 0.25 N per 50 mm width or alternatively an increase in percentage terms of the Peel Strength at five days, with regard to the same Peel Strength measured at time zero, that is not lower than 30%.

41. Hot-melt adhesive formulation according to claim 1, which, after having been aged for five days at 23° C. and 50% relative humidity, has a Shear Strength not lower than twelve hours or alternatively has an increase of the Shear Strength at five days, with regard to the same Shear Strength measured at time zero, that is not lower than three hours.

42. A bonded structure comprising:
a first substrate;
a second substrate;
a hot-melt adhesive formulation according to claim 1, bonding the first substrate to the second one, which, when applied to a basis weight between 0.5 g/m$^2$ and 50 g/m$^2$, gives the bonded structure a Peel Strength, measured after five days of aging at 23° C., greater than 0.25 N per 50 mm width.

43. A bonded structure according to claim 42, wherein at least one of the two substrates is a porous or fibrous substrate or a perforated film both with a bidimensional or a tridimensional structure.

44. An absorbent hygienic article, comprising a bonded structure according to claim 42.

45. An absorbent hygienic article, comprising the hot-melt adhesive formulation according to claim 1.

46. Article according to claim 45, wherein said article is a baby-diaper, a training pants diaper, a diaper for incontinent adults, a feminine catamenial pad.

47. An absorbent hygienic article as according to claim 45, wherein the hot-melt adhesive formulation is used for at least one of the following uses: i) general construction adhesive of the whole article; ii) for bonding elastic components (threads, ribbons, films or elastic panels, etc.); iii) for strengthening and ensuring, even in use, the integrity of the absorbent core of the absorbent hygienic article; iv) for the bonding of perforated films both with a bidimensional or tridimensional structure.

48. Article comprising the hot-melt adhesive formulation according to claim 1, wherein said article is an absorbent surgical mattress or sheet or surgery laminate for medical use or a wound-dressing product.

49. Article comprising the hot-melt adhesive formulation according to claim 1, wherein said article is a mattress or a component thereof.

50. Article comprising the hot-melt adhesive formulation according to claim 1, wherein said article is a packaging.

* * * * *